(12) United States Patent
Martindale

(10) Patent No.: US 10,919,053 B2
(45) Date of Patent: Feb. 16, 2021

(54) PARTICULATE SEPARATOR

(71) Applicant: CORY M HOLDINGS LTD., Mara (CA)

(72) Inventor: Cory Martindale, Mara (CA)

(73) Assignee: Cory M Holdings Ltd., Mara (CA)

( * ) Notice: Subject to any disclaimer, the term of this patent is extended or adjusted under 35 U.S.C. 154(b) by 192 days.

(21) Appl. No.: 16/091,878

(22) PCT Filed: Apr. 5, 2017

(86) PCT No.: PCT/CA2017/050418
§ 371 (c)(1),
(2) Date: Oct. 5, 2018

(87) PCT Pub. No.: WO2017/173542
PCT Pub. Date: Oct. 12, 2017

(65) Prior Publication Data
US 2019/0134650 A1 May 9, 2019

Related U.S. Application Data

(60) Provisional application No. 62/318,702, filed on Apr. 5, 2016.

(51) Int. Cl.
| | |
|---|---|
| *B01D 45/12* | (2006.01) |
| *B04C 5/26* | (2006.01) |
| *B04C 5/15* | (2006.01) |
| *B04C 9/00* | (2006.01) |
| *B04C 5/24* | (2006.01) |
| *B01D 45/16* | (2006.01) |
| *B04C 5/28* | (2006.01) |

(52) U.S. Cl.
CPC ............... *B04C 5/26* (2013.01); *B01D 45/12* (2013.01); *B01D 45/16* (2013.01); *B04C 5/15* (2013.01); *B04C 5/24* (2013.01); *B04C 5/28* (2013.01); *B04C 9/00* (2013.01)

(58) Field of Classification Search
CPC .......... B01D 45/12; B01D 45/16; B04C 5/15; B04C 5/26; B04C 5/28
USPC .......................... 55/429, 430, 432, 343, 346
See application file for complete search history.

(56) References Cited

U.S. PATENT DOCUMENTS

| | | | |
|---|---|---|---|
| 1,416,995 | A | 5/1922 | Stroud |
| 1,841,556 | A | 1/1932 | Stelz |
| 1,940,196 | A | 12/1933 | Wagner |
| 2,074,818 | A | 3/1937 | Watson |
| 2,222,930 | A | 11/1940 | Arnold |
| 2,372,514 | A | 3/1945 | Pootjes |
| 2,504,944 | A | 4/1950 | Atkinson, Jr. |
| 2,551,890 | A | 5/1951 | Love |

(Continued)

OTHER PUBLICATIONS

Morgan, L., "Recirculating air from dust collectors", Plant Engineering, Sep. 2001, [online] retrieved Jul. 25, 2017.

*Primary Examiner* — Robert A Hopkins
(74) *Attorney, Agent, or Firm* — Oyen Wiggs Green & Mutala LLP

(57) ABSTRACT

A two-stage particulate separator, comprising: a primary cyclone; a plurality of secondary cyclones circumferentially spaced around the primary cyclone; each of the cyclones having an inlet at an upper end thereof and an outlet at a lower end thereof, the inlets of the secondary cyclones are in communication with the primary cyclone; and an airlock coupled to the outlet of each of the cyclones.

30 Claims, 18 Drawing Sheets

(56) References Cited

U.S. PATENT DOCUMENTS

| | | | |
|---|---|---|---|
| 2,553,175 A | 5/1951 | Davenport et al. | |
| 2,648,532 A | 8/1953 | Muller et al. | |
| 2,684,232 A | 7/1954 | Caldwell | |
| 3,061,994 A | 11/1962 | Mylting | |
| 3,425,192 A | 2/1969 | Davis | |
| 4,201,256 A | 5/1980 | Truhan | |
| 4,222,529 A | 9/1980 | Long | |
| 4,260,401 A | 4/1981 | Truhan et al. | |
| 4,336,040 A | 6/1982 | Haberl | |
| 4,373,228 A | 2/1983 | Dyson | |
| 4,409,008 A | 10/1983 | Solymes | |
| 4,424,069 A | 1/1984 | Chang | |
| 4,593,429 A | 6/1986 | Dyson | |
| 4,599,016 A | 7/1986 | Medemblik | |
| 4,863,500 A | 9/1989 | Rombout et al. | |
| 4,891,129 A | 1/1990 | Barnes | |
| 5,046,265 A * | 9/1991 | Kalb | C10F 5/00 |
| | | | 34/402 |
| 5,558,697 A | 9/1996 | Dyson et al. | |
| 6,344,064 B1 | 2/2002 | Conrad | |
| 6,782,585 B1 | 8/2004 | Conrad et al. | |
| 7,128,770 B2 * | 10/2006 | Oh | A47L 9/1625 |
| | | | 55/343 |
| 7,462,212 B2 | 12/2008 | Han et al. | |
| 7,534,279 B2 | 5/2009 | Oh et al. | |
| 7,976,597 B2 | 7/2011 | Smith | |
| 8,562,705 B2 | 10/2013 | Courtney et al. | |
| 8,568,500 B2 | 10/2013 | Han et al. | |
| 2016/0000283 A1 | 1/2016 | Hinchliffe et al. | |

* cited by examiner

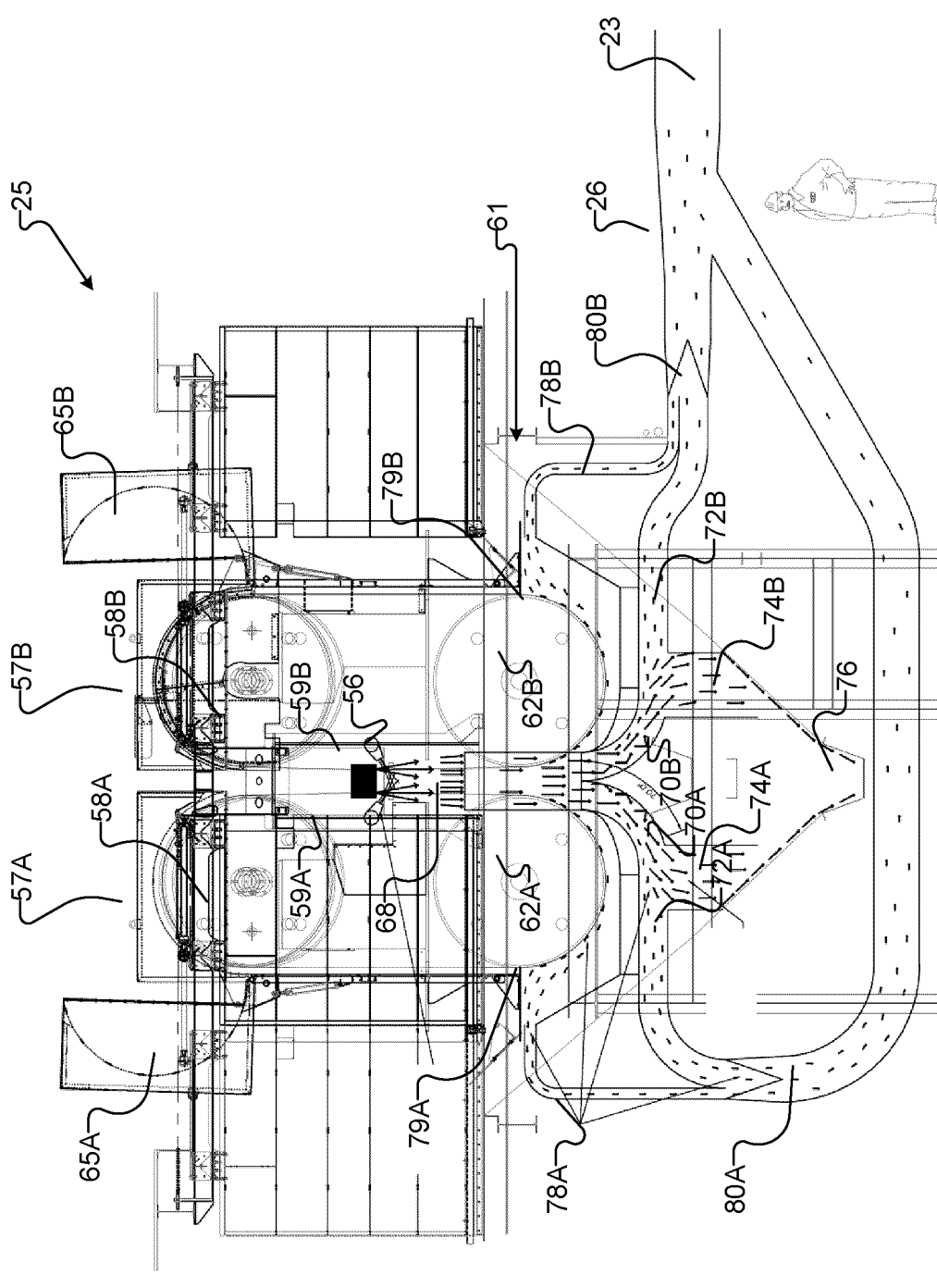

PARTICULATE SEPARATOR

CROSS-REFERENCE TO RELATED APPLICATIONS

This application claims priority from U.S. Application No. 62/318,702 filed 5 Apr. 2016. For purposes of the United States, this application claims the benefit under 35 U.S.C. § 119 of U.S. Application No. 62/318,702 filed 5 Apr. 2016 and entitled PARTICULATE SEPARATOR which is hereby incorporated herein by reference for all purposes.

FIELD

This invention relates to particulate separators, and more particularly to multi-stage particulate separators involving a cyclonic or centrifugal separation. Example applications are in sawmills and other industrial settings where dust or particulates are an issue.

BACKGROUND

Wood dust that is generated in sawmills creates safety and environmental concerns. If the wood dust is not adequate removed, the dust concentration generated by the sawmill operations can reach explosive levels within an enclosed space. As a result of the accumulation of dust particles, dust explosions can occur. Conventional separation systems that are used in sawmills are not capable of removing fine dust particulates. This is undesirable because the build-up of particulates of such size could readily lead to a dust concentration within an explosive range.

The explosion hazard posed by combustible particulates in air is also an issue in other industries including flour milling, grain handling and coal mining and processing.

There is thus a desire for a particulate separator that is capable of removing fine dust particulates from air and thus provides a safe and clean working environment during the operation of dust-generating machinery.

SUMMARY

One aspect of the invention provides a two-stage particulate separator. The separator comprises a primary cyclone and a plurality of secondary cyclones circumferentially-spaced around the primary cyclone. Each of the cyclones has an inlet at an upper end and an outlet end at a lower end and the inlets of the secondary cyclones are in communication with the primary cyclone. The separator also includes an airlock coupled to the outlet of each of the cyclones for receiving the particulates discharged from the primary and secondary cyclones. The accumulated particulates exit the airlock in a controlled manner through a single discharge opening defined in a bottom cover of the primary airlock.

Another aspect of the invention provides a particle separator comprising a primary cyclone having an inlet and at least one outlet at an upper end thereof and a particle outlet at a lower end thereof and a plurality of secondary cyclones. Each of the secondary cyclones has an inlet connected to the at least one outlet of the primary cyclone, an outlet and a particulate outlet. The particulate outlets of the primary and secondary cyclones are connected to discharge particles through one or more corresponding airlocks. The one or more airlocks block direct flows of air between the particulate outlet of the primary cyclone and the particulate outlets of any of the secondary cyclones. The airlocks may be driven by a common driver (e.g. a motor). In some embodiments, the one or more airlocks includes a plurality of airlocks and one of the airlocks discharges particles into another one of the airlocks.

In some embodiments, a plurality of the secondary cyclones are connected to discharge particulates into a secondary airlock, the primary cyclone is connected to discharge particulates into a primary airlock. In some embodiment, the secondary airlock is connected to discharge particulates into the primary airlock. In some such embodiments, the secondary airlock comprises a rotatable body and particles discharged from the primary cyclone pass through an aperture in the rotatable body into the primary airlock.

One aspect of the invention provides an airlock for discharging particulates collected from a plurality of cyclones. The airlock comprises a secondary airlock, an outlet plate, and a primary airlock. The secondary airlock has an annular rotatable body. In some embodiments, the body includes a plurality of ring-shaped discs that are stacked in the vertical direction. The body comprises a plurality of circumferentially-spaced apertures. The apertures are on circles of the same diameter such that the apertures penetrate the body to receive and dispense particulates discharged from the secondary cyclones. Such apertures can be rotated into communication with an outlet aperture defined in the outlet plate positioned between the primary and secondary airlocks. The outlet aperture is also positioned in alignment with an inlet aperture defined in the primary airlock so that particulates stored in each of the apertures can exit the secondary airlock and fall into a housing of the primary airlock. The housing comprises a rotating barrier member. The rotating motion of the barrier member carries the accumulated particulates to a discharge opening at the bottom of the primary airlock.

Another aspect of the invention provides a method for removing particulates from a building. The method comprises connecting one or more enclosures in a building upstream of a particulate separator. The particulate separator is adapted to remove particles from air before discharging the air and to recycle a major portion of discharged air into the one or more enclosures. A minor portion of discharged air is exhausted to the atmosphere.

Another aspect of the invention provides connecting one or more enclosures upstream of a particulate separator. The one or more enclosures include a first separation system for separating large particulates from an airflow prior to entering the separator. The enclosures comprise a particle source (e.g. a saw, planer, debarker, mill or the like), which is a point of particulate generation, and two curved plates positioned under the particle source. The enclosures also include two diverging ducts positioned near an end of the curvature of each curved plate and two upper discharge ducts positioned at an outer side of its respective curved plates, opposite to the side of the curvature. The two diverging ducts each includes a first duct which extends in a downward direction towards an outlet of the system and a second duct which extends in a transverse direction. The second ducts and upper discharge ducts merge to form a suction pipe. The suction pipe connects the enclosures to a particulate separator. The particulate separator is operable to separate finer particulates from the airflow.

Another aspect of the invention provides a particulate collector comprising an enclosure surrounding a source of sawdust or other particles. An air inlet, which may comprise an air knife and a suction outlet, are provided in the enclosure such that the particle source is between the air inlet and suction outlets. Plates or baffles may be provided between the particle source and the suction outlet. The plates or baffles may be arranged to cause air flowing toward the suction outlet to travel at differing velocities. In some embodiments, airflow is faster near the particle source, drops to a lower speed to allow larger particles to drop out of the airflow, and the airflow is then accelerated toward the suction inlet. In some embodiments, the general airflow from the air inlet to the lower-airspeed section is downward.

Further features and aspects of the invention are described below and/or shown in the drawings.

BRIEF DESCRIPTION OF THE DRAWINGS

The accompanying drawings illustrate non-limiting example embodiments of the invention.

FIG. 7 is an isolated sectional view of the enclosure of FIG. 5.

DETAILED DESCRIPTION OF EXAMPLE EMBODIMENTS

Figure 1:
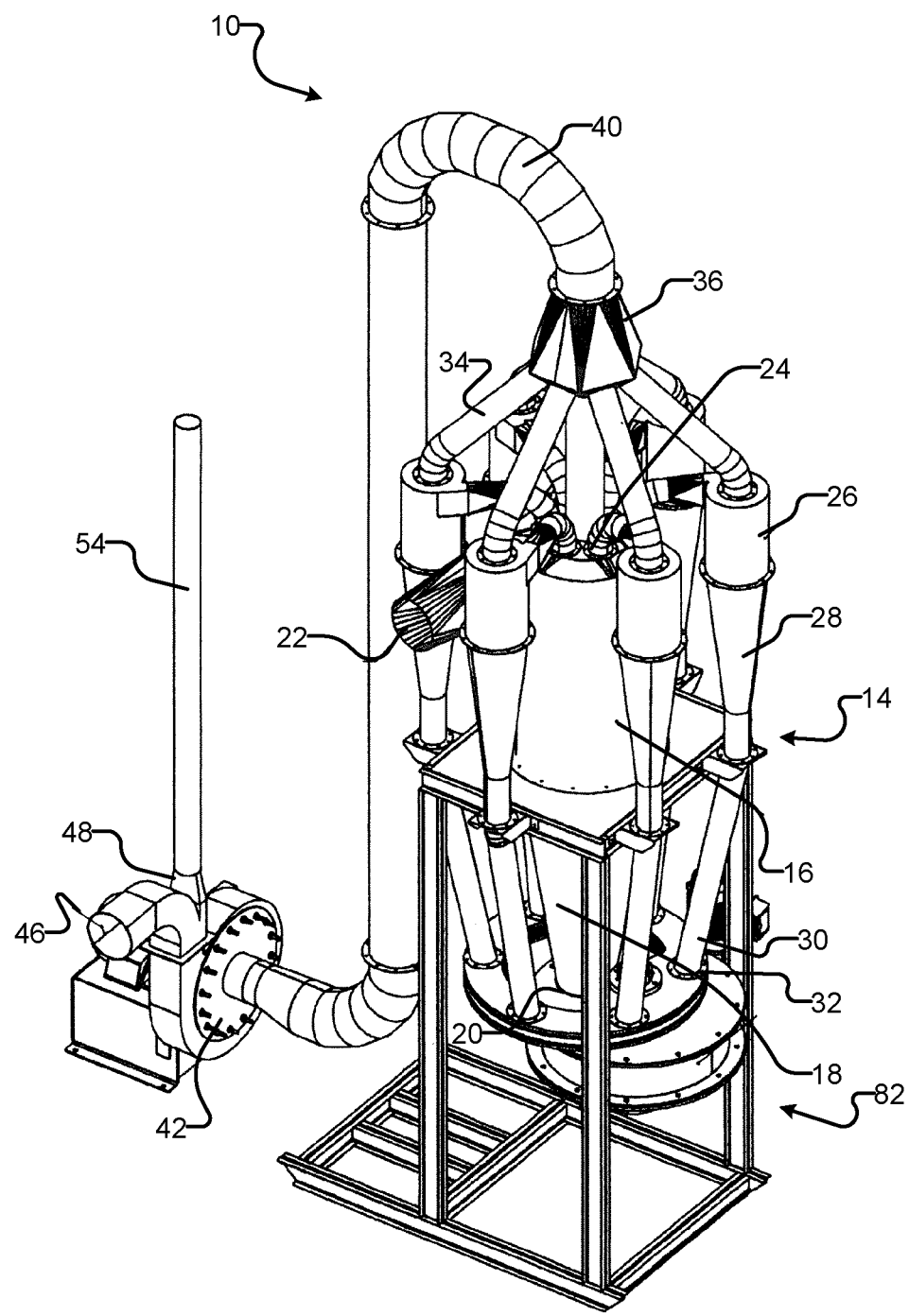
FIG. 1 is a perspective view of a cyclone system according to an example embodiment of the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

One aspect of the invention relates to particulate separators, in particular, to multi-stage cyclone systems for removing particulates from an air stream.

Referring to FIGS. 1 to 5, cyclone system 10 comprises a primary cyclone 12 and a plurality of secondary cyclones 14. The secondary cyclones 14 are circumferentially-spaced around primary cyclone 12. Primary cyclone 12 comprises an upper cylindrical portion 16 and a lower tapering portion 18. In the illustrated embodiment, lower tapering portion 18 has an inverted conical configuration. A bottom end of lower tapering portion 18 comprises a primary discharge 20 for discharging particulates. A top end of cylindrical portion 16 is connected to a primary inlet 22 and a plurality of secondary inlets 24. Each secondary inlet 24 is connected to deliver air exiting primary cyclone 12 to an inlet opening located near a top end of a respective secondary cyclone 14. An exit tube 16 projects into the interior of primary cyclone 12. Exiting air flows through exit tube 16 to secondary inlets 24.

In the illustrated embodiment, primary inlet 22 extends in a direction generally tangentially to the outer surface of primary cyclone 12. A stream of contaminated air thus flows transversely into cylindrical portion 16 through primary inlet 22. In the illustrated embodiments, secondary inlets 24 are connected to the apex of cylindrical portion 16 such that a stream of air flows out of cylindrical portion 16 through secondary inlets 24 near the centerline of system 10. The air is then directed tangentially into secondary cyclones 14.

Figure 5:
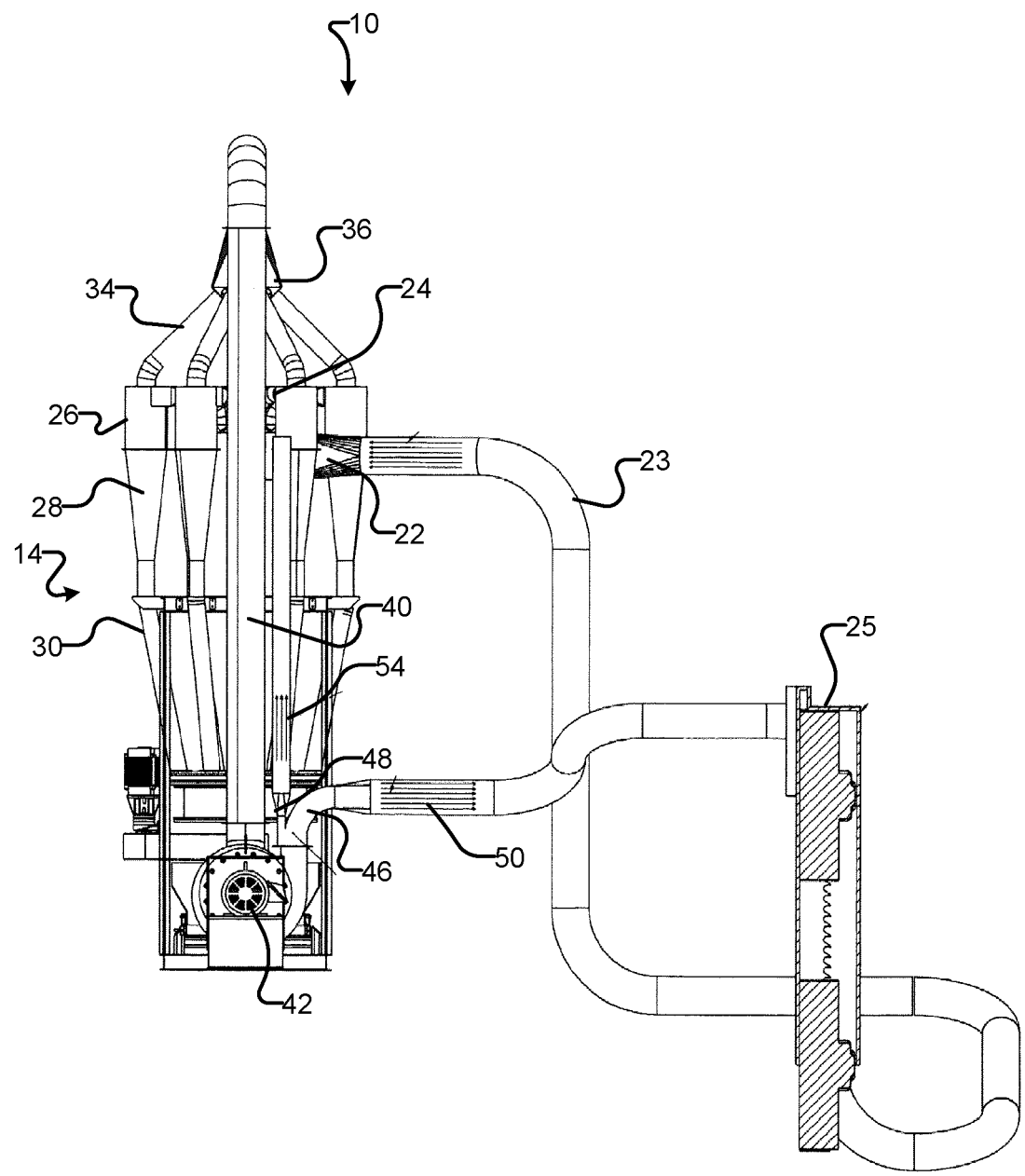
FIG. 5 is a back view of the cyclone system of FIG. 1 with details of the connections between the cyclone system and an enclosure according to an example embodiment of the invention.

In the illustrated embodiment, six secondary cyclones 14 are provided; this is not mandatory, however. Any suitable number of secondary cyclones 14 may be provided. Primary inlet 22 is connected to a suction pipe 23 (as shown in FIG. 5). Suction pipe 23 brings a flow of air carrying particulates to system 10. In some embodiments, suction pipe 23 is connected to an enclosure 25, within which particulates are generated. Enclosure 25 may for example be associated with a machine which creates particulates. For example, enclosure 25 may be associated with a saw, planer, sander, or the like that produces wood dust in operation.

Each secondary cyclone 14 comprises an upper cylindrical portion 26 and a tapering portion 28. In some embodiments, tapering portion 28 has an inverted conical configuration. A lower cylindrical portion 30 may be coupled to the bottom of the tapering portion 28 for delivering separated particulates downwardly to a secondary discharge 32 to exit system 10. A bottom end of lower cylindrical portion 30 is coupled to secondary discharge 32. A top end of each of the upper cylindrical portion 26 is connected to a secondary outlet 34. An exit tube 27 projects inwardly into each secondary cyclone 14.

Figure 4:
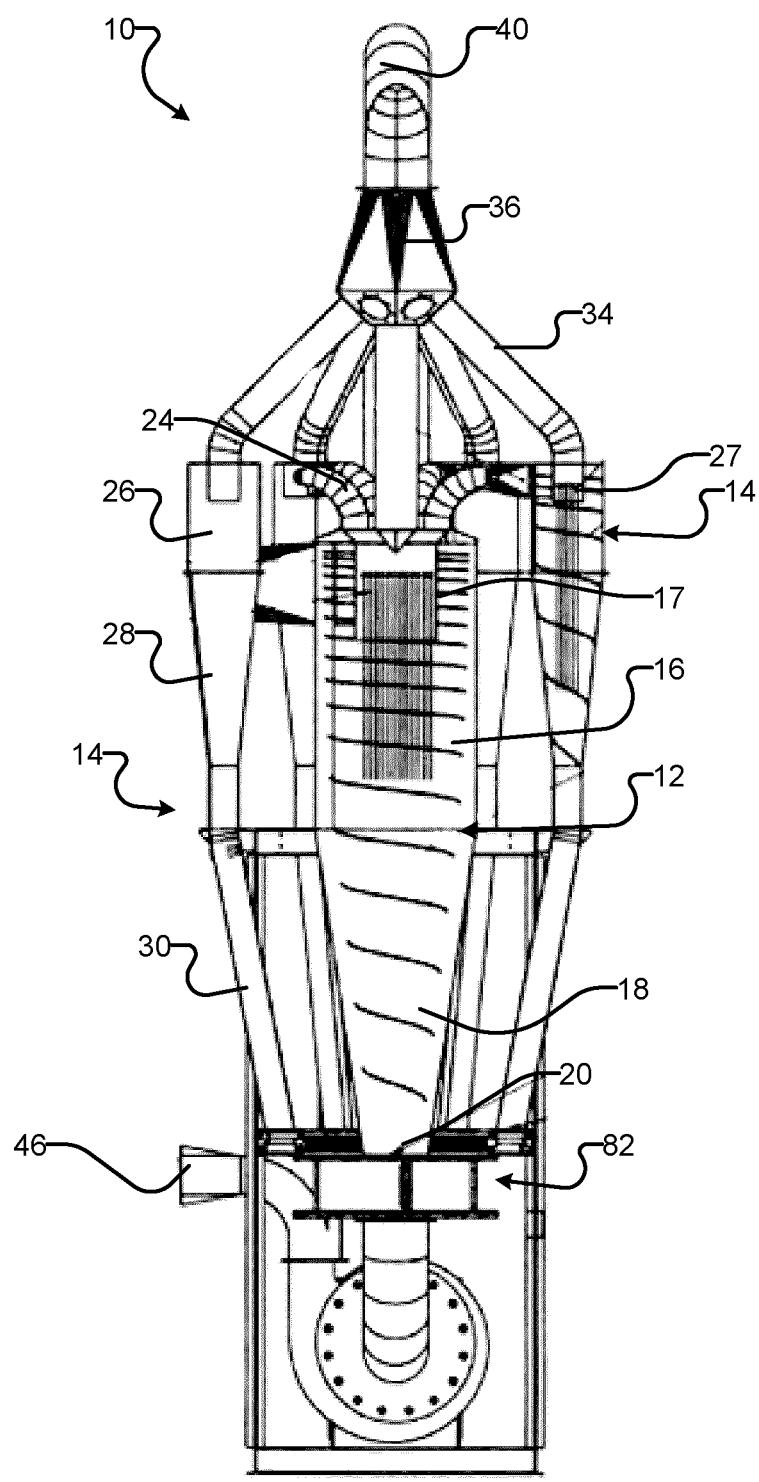
FIG. 4 is a sectional view taken along line 4-4 of FIG. 3.
Figure 11:
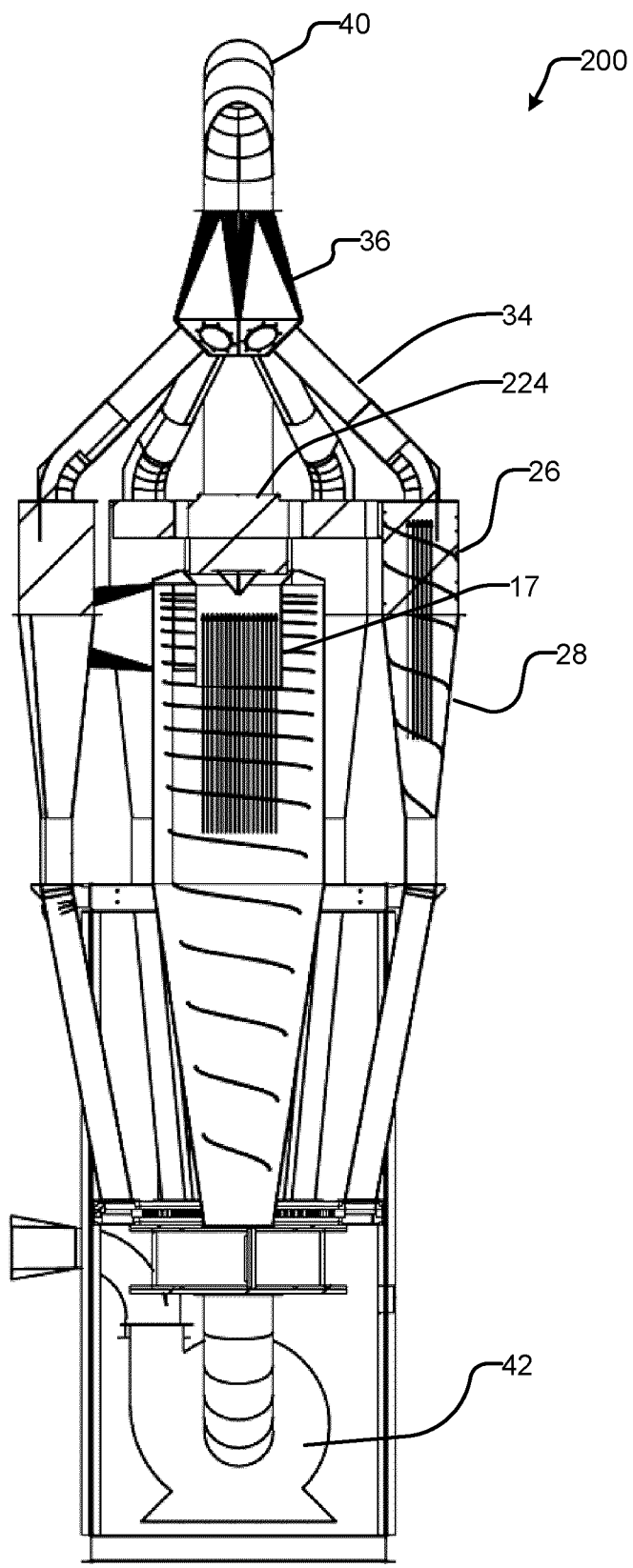
FIG. 11 is a sectional view taken along line 11-11 of FIG. 10.
Figure 12:
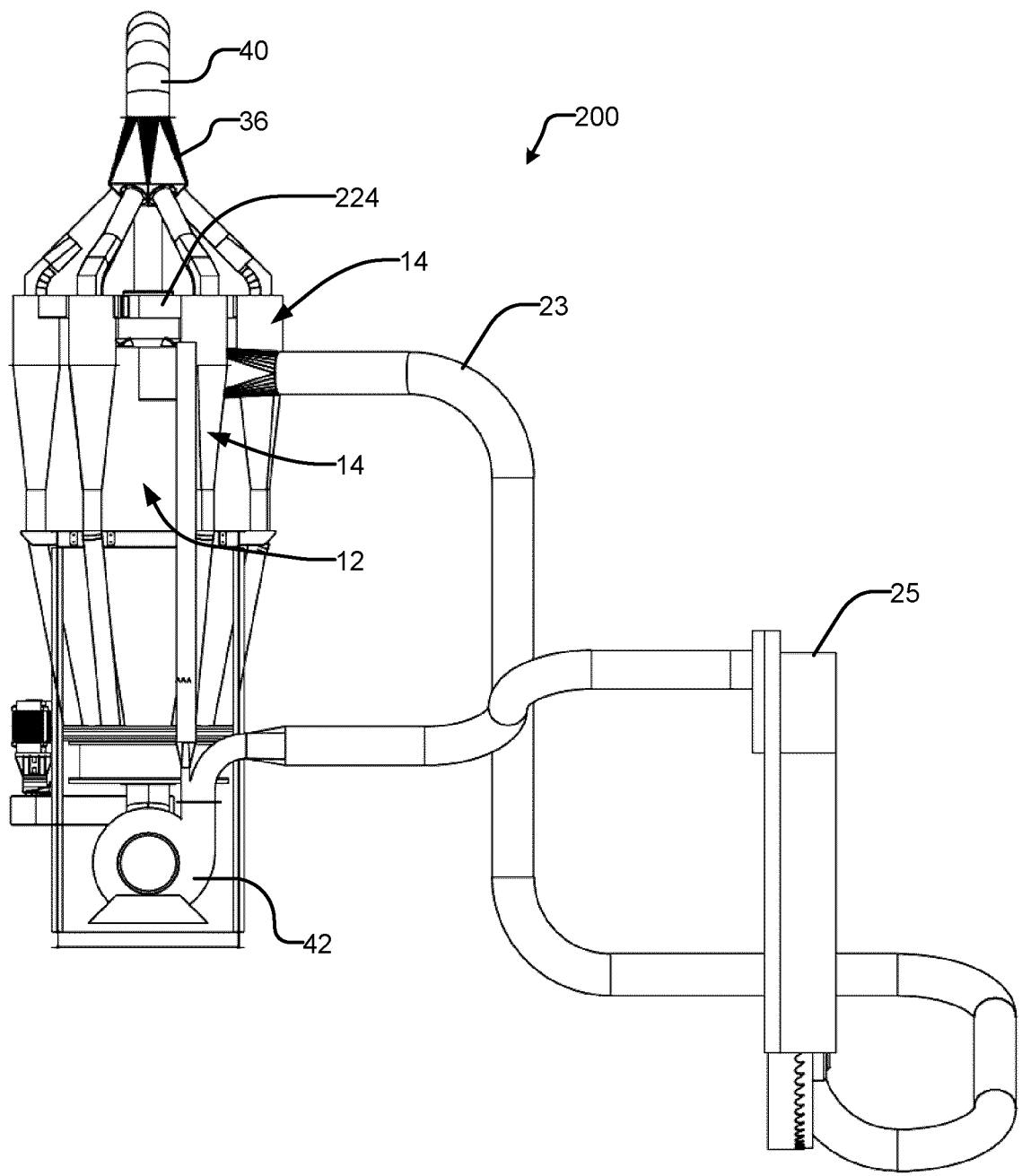
FIG. 12 is a back view of the cyclone system of FIG. 8 with details of the connections between the cyclone system and an enclosure according to an example embodiment of the invention.

FIG. 4 is a cross-section view which shows the inside of main cyclone 12 and one secondary cyclone 14. The lines inside main cyclone 12 show how air entering main cyclone 12 travels downward while swirling around inside main cyclone 12 before travelling upwardly and exiting axially through exit tube 27. A similar flow of air occurs in secondary cyclones 14. Similar lines are shown in FIG. 11 which depicts an alternative implementation.

At the end opposite from the top end of upper cylindrical portion 26, the plurality of secondary outlets 34 are connected to a single connector 36. Connector 36 may be positioned at the apex of cyclone system 10. Connector 36 may be attached to a pipe 40 for transporting the output airflow released from secondary outlets 34 out of system 10.

In the illustrated embodiment, the diameter of the primary cyclone 12 is greater than the diameter of each secondary cyclone 14. In some embodiments, the diameter of each secondary cyclone 14 is in the range of from about ½ to about ⅙ of the diameter of primary cyclone 12. The total length of primary cyclone 12 is approximately the same as the combined lengths of upper cylindrical portion 26, tapering portion 28 and lower cylindrical portion 30 of each secondary cyclone 14. In some embodiments, the length of upper cylindrical portion 16 of primary cyclone 12 is approximately the same as the combined lengths of upper cylindrical portion 26 and middle inverted conical portion 28 of secondary cyclone 14, and that the length of lower inverted conical portion 18 of primary cyclone 12 is approximately the same as the length of lower cylindrical portion 30 of secondary cyclone 14.

In the illustrated embodiment, primary discharge 20 and secondary discharge 32 are coupled to an airlock 82. Airlock 82 provides an air seal to the system while allowing particulates to the discharged. Airlock 82 limits the airflow exiting the chambers by way of primary discharge 20 and secondary discharges 32. Rotary airlocks further control the rate of release of particulates out of system 10.

Figure 6A:
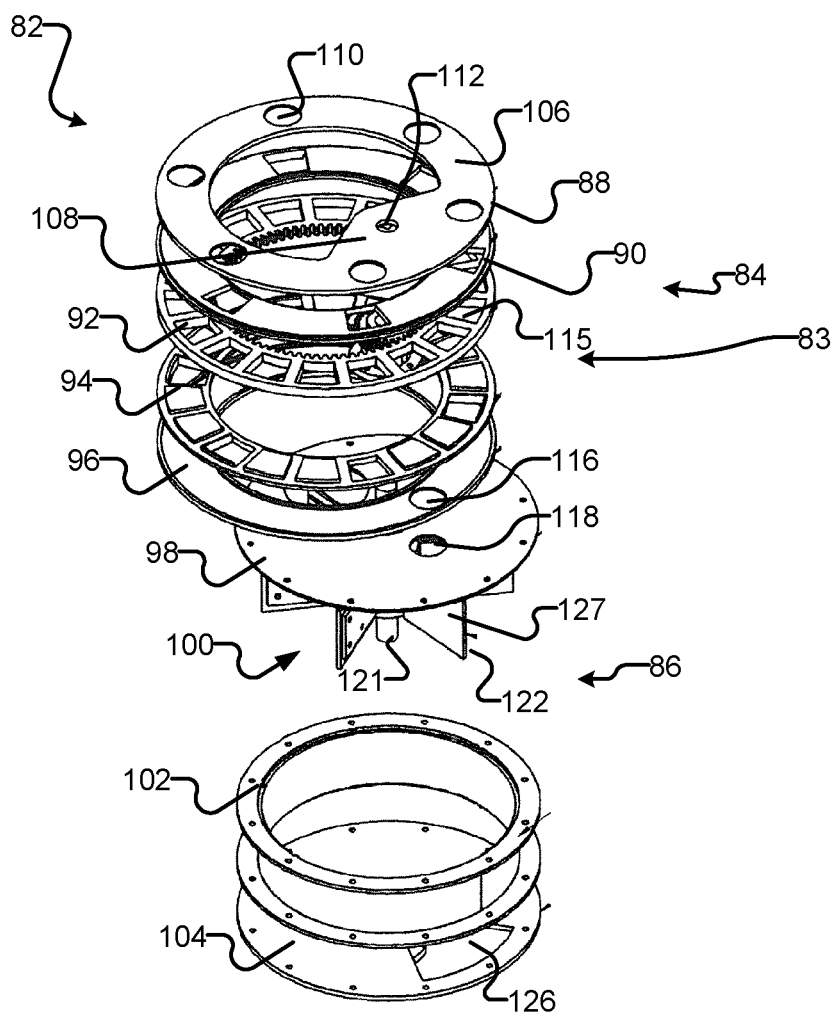
FIG. 6A is an isolated exploded view of an airlock of the cyclone system of FIG. 1.
Figure 6B:
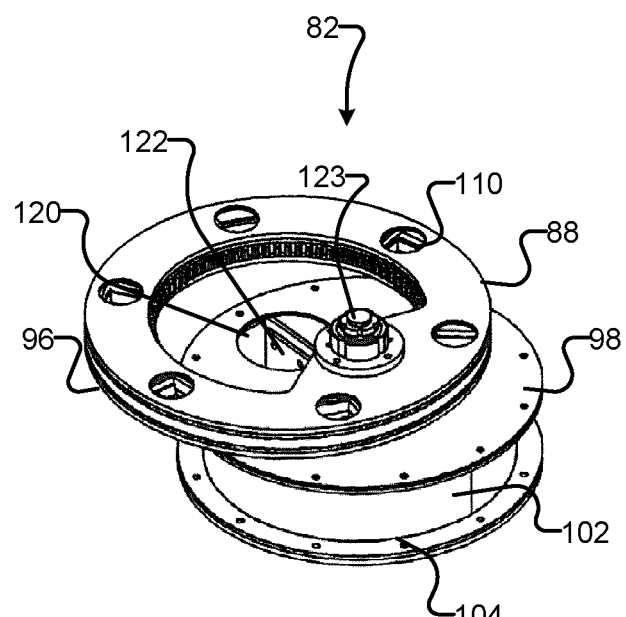
FIG. 6B is a top perspective view of the airlock of FIG. 6A.

FIGS. 6A to 6E show a detailed view of the airlock of the cyclone system according to an example embodiment. Referring to FIG. 6A, airlock 82 comprises a secondary airlock 84, an outlet ring 96, and a primary airlock 86 attached to the bottom of secondary airlock 84.

Secondary airlock 84 comprises a rotatable body 83 penetrated by circumferentially spaced-apart apertures. In some embodiments, body 83 has an annular configuration. In the illustrated embodiment body 83 comprises a plurality of ring-shaped discs 92, 94 stacked in the vertical direction. Each of discs 92, 94 comprises a plurality of apertures circumferentially-spaced apart on a circle. The apertures defined in each of the discs 92, 94 are on circles of the same diameter such that the apertures penetrate body 83.

Secondary airlock 84 comprises secondary cyclone inlet 88 for each of secondary cyclones 14. In the illustrated embodiment, inlet 88 comprises apertures 110 in a top plate 106. Apertures 110 are shaped and sized to fit under each secondary discharge outlet 32 for receiving particulates discharged from secondary cyclones 14. In the illustrated embodiments, six secondary cyclones 14 are provided and thus six apertures 110 are provided.

In some embodiments secondary airlock 84 comprises a seal between body 83 and top plate 106. In the illustrated embodiment a top valve ring 90 provides a mechanical seal. Bottom valve ring 94 is included in rotatable body 83 and serves as a second mechanical seal. Top and bottom valve rings 90, 94 may be stacked between inlet 88 and outlet ring 96. In the illustrated embodiments, top valve ring 90 is stacked between secondary inlet 88 and a ring gear 92, and bottom valve ring 94 is stacked between ring gear 92 and an outlet plate 96.

In the illustrated embodiments, the apertures of bottom valve ring 94 are in alignment with the apertures of ring gear 92 such that bottom valve ring 94 is rotated with ring gear 92. In some embodiments, bottom valve ring 94 is fixed in position in body 83. In such alternative embodiments, when ring gear 92 is rotated, bottom valve ring 94 remains stationary.

In the illustrated embodiments, the apertures defined in ring gear 92 and top and bottom valve rings 90, 92 each comprises a isosceles trapezoid configuration. In the illustrated embodiments, apertures 100 comprise a circular configuration. Other shapes are possible.

Outlet plate 96 separates secondary airlock 84 and primary airlock 86. Outlet plate 96 comprises an aperture 116. Aperture 116 is not aligned with any of apertures 110. Aperture 116 is positioned so that the apertures in rotatable body 83 can be rotated into communication with aperture 116 so that particulates being carried in apertures of rotatable body 83 can fall through aperture 116 as rotatable body 83 turns. Outlet plate 96 is securely mounted on a top cover 98 of primary airlock 86. Aperture 116 of outlet ring 96 is aligned with an aperture 118 defined in top cover 98 to permit particulates to fall downwardly from secondary airlock 84 into primary airlock 86. Particulates discharged from secondary cyclones 14 fall though apertures 116 and 118 into housing 102.

Primary airlock 86 comprises a top cover 98, a housing 102 and a bottom cover 104 comprising an outlet 126. An aperture 120 in top cover 98 is arranged to receive particulates from outlet 20 of primary cyclone 12. Outlet 126 allows the combined discharge from primary cyclone 12 and secondary cyclones 14 received in housing 102 to exit airlock 82.

A rotating barrier member 103 is provided in housing 102. The barrier member blocks air from flowing to outlet 126 from inlet aperture 120. In the illustrated embodiment the barrier member comprises a paddle wheel comprising radially-extending vanes 122. Particulates that enter housing through apertures 120 or 116, 118 fall between vanes 122. The rotation of vanes 122 then carries the accumulated particulates to opening 126.

In some embodiments, outlet 126 has a size smaller than a surface area of the bottom cover 104. In some embodiments, the size of outlet 126 is approximately ⅙ the surface area of bottom cover 104.

It can be appreciated that the construction of airlock 92 permits particulates to be discharged from all of secondary cyclones 14 and primary cyclone 12 while blocking the possibility of direct airflow between the outlets of primary cyclone 12 and any of secondary cyclones 14 and also blocking the possibility of direct airflow between outlet opening 126 and any one of cyclones 12 or 14.

Rotatable member 83 is rotatable relative to aperture 116. During each rotation of rotatable member 83, each of the plurality of apertures 115 has an opportunity to align with apertures 116 and 118. Alignment of the apertures in rotatable member 83 with apertures 116 and 118 results in particulates that are discharged from secondary cyclones 14 and subsequently received in the plurality of apertures 115 defined in discs 83 falling through apertures 116 and 118 into housing 102 of primary airlock 86.

The volume of each of apertures 115 may be adjusted by changing the thickness of rotatable member 83 and/or by changing the cross-sectional area of apertures 115.

Figure 2:
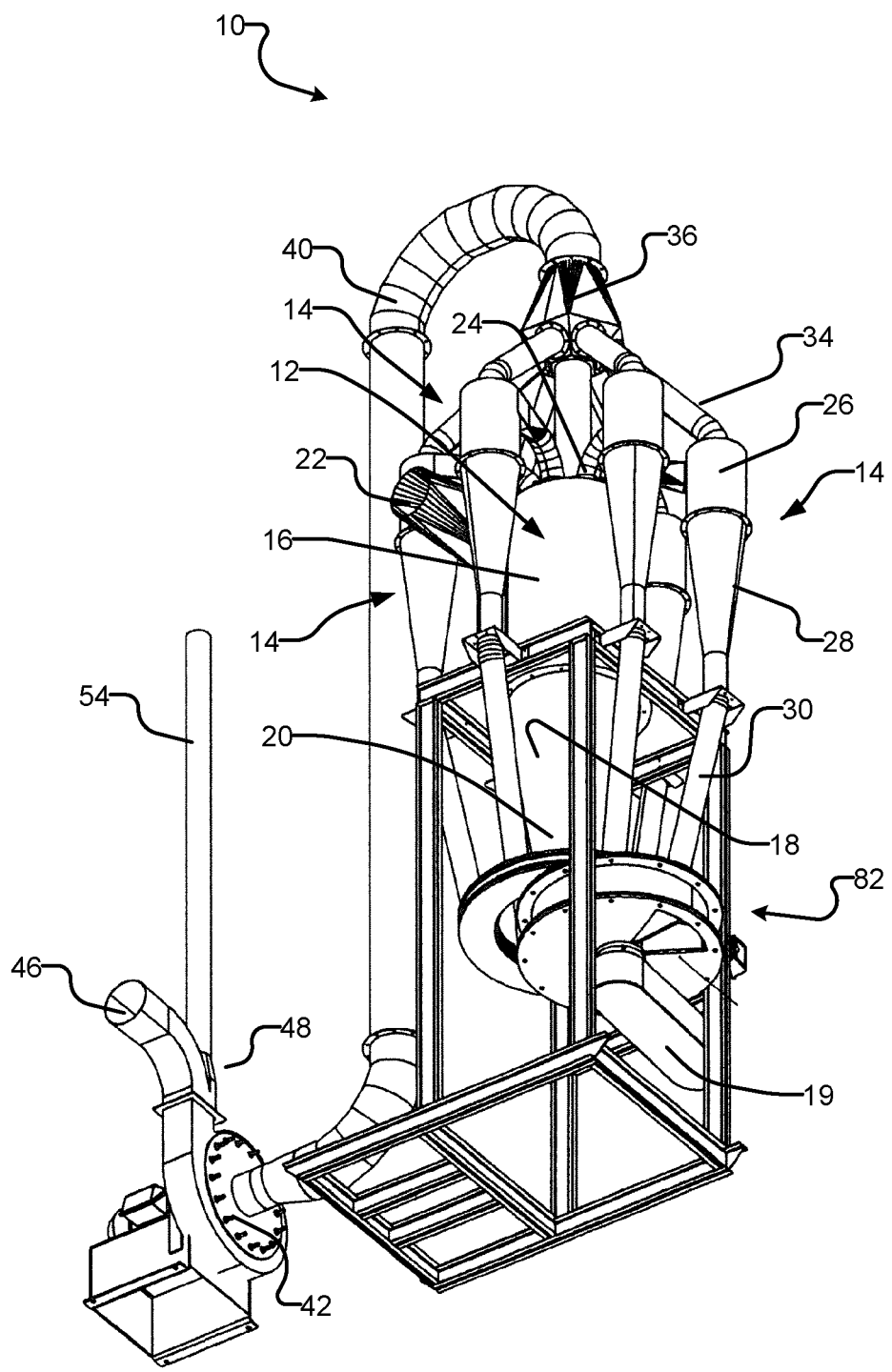
FIG. 2 is a perspective bottom view of the cyclone system of FIG. 1.
Figure 3:
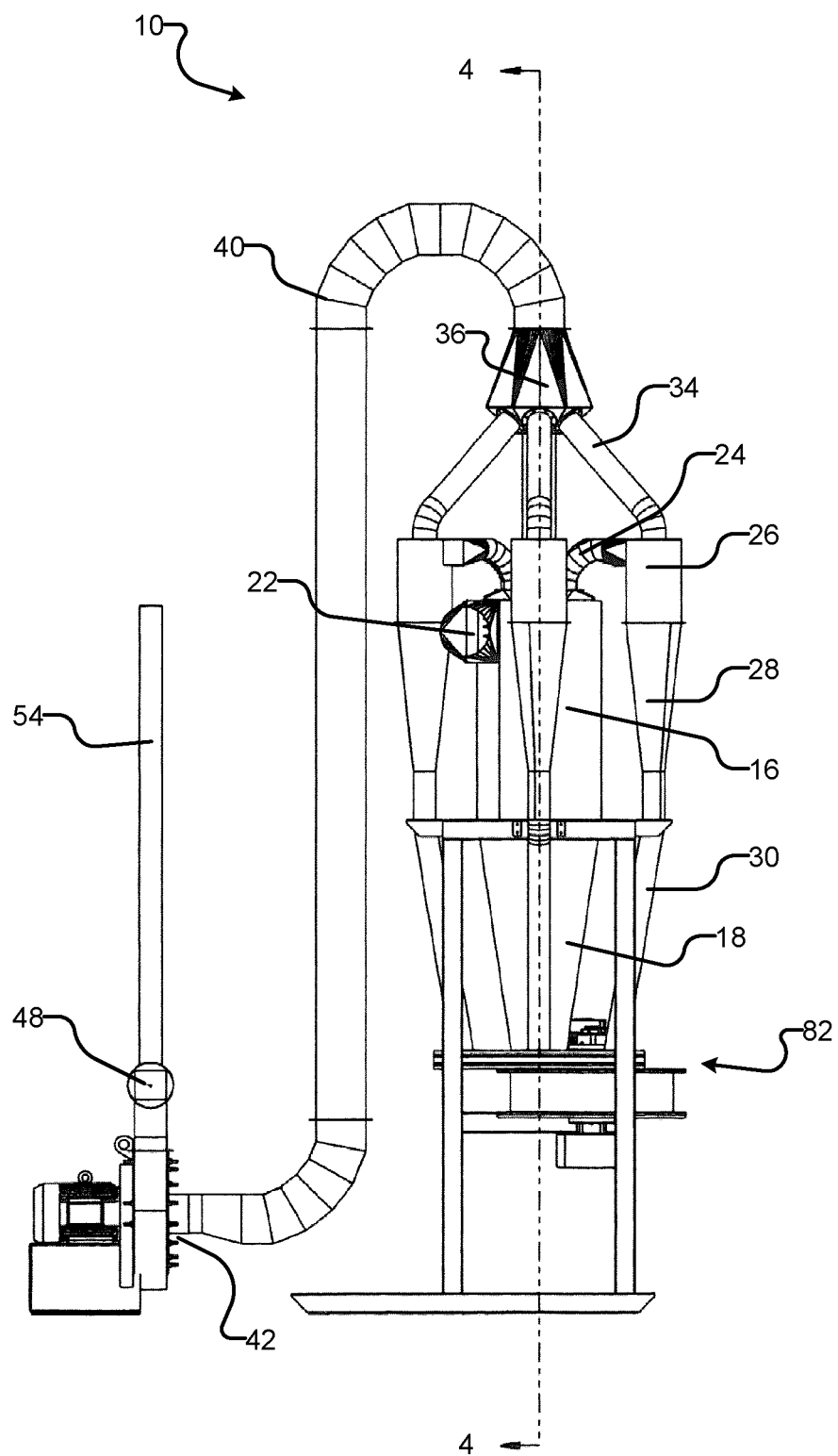
FIG. 3 is a side view of the cyclone system of FIG. 1.

In some embodiments, the paddlewheel comprising vanes 122 is rotatable by means of a rotor 100. Rotor 100 may comprise a rotatable shaft 121 driven by a motor 19 (as best seen in FIG. 2). Vanes 122 are directly or indirectly mounted to rotate with shaft 121.

In the illustrated embodiment rotatable body 83 is driven by a gear 114 carried on shaft 121. The top end of shaft 121 is received in aperture 112. Gear 114 engages internal teeth on body 83 (e.g. on disc 92 which is formed as a ring gear—as best seen in FIG. 6E). The engagement between ring gear 92 and gear 114 of shaft 121 allows body 83 of secondary airlock 84 to rotate relative to primary airlock 86 by rotating shaft 121. Since ring gear 92 is larger in diameter than gear 114, shaft 121 rotates more quickly than body 83. In some embodiments the gear ratio between body 83 and shaft 121 is in the range of 3 to 1 to 6 to 1.

In such embodiments, shaft 121 comprises a longitudinal axis that extends along a length of airlock 82 perpendicular to body 83. Each vane 122 comprises opposite-facing faces 127. Slots defined between adjacent ones of faces 127 make pockets 124. Rotation of shaft 121 thus rotates vanes 122 and pockets 124. Vanes 122 are housed in housing 102, in which particulate discharges are collected. Thus, rotation of vanes 122 and pocket 124 allow particulates that are received in housing 102 (and thus in each pocket 124) to be carried to a position where the particulates are discharged through outlet 126 in a controlled manner.

Figure 6C:
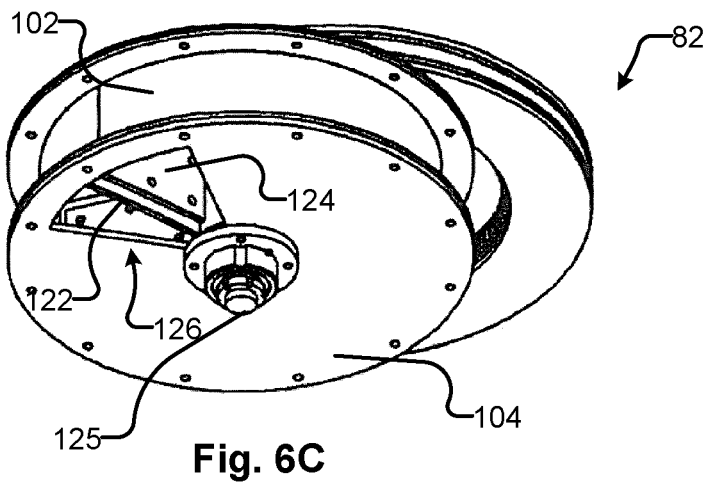
FIG. 6C is a bottom perspective view of the airlock of FIG. 6A.
Figure 6D:
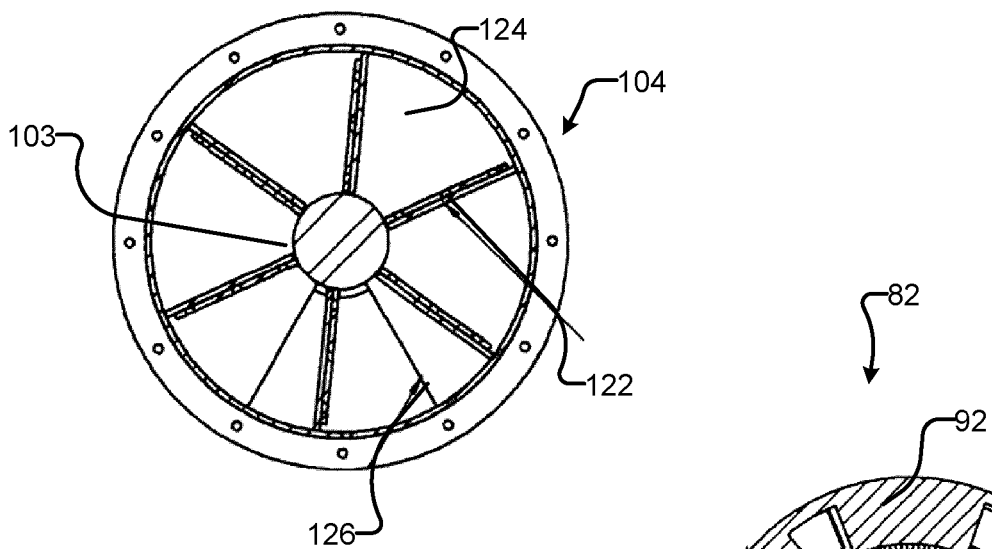
FIG. 6D is a bottom plan view of the airlock of FIG. 6A.
Figure 6E:
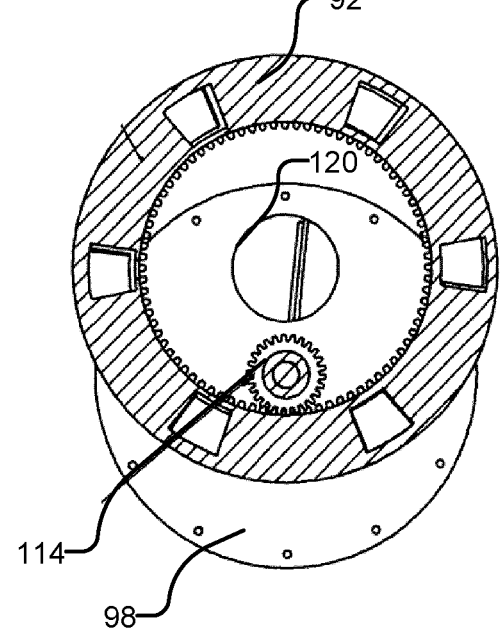
FIG. 6E is a sectional top plan view of the airlock of FIG. 6B.
Figure 8:
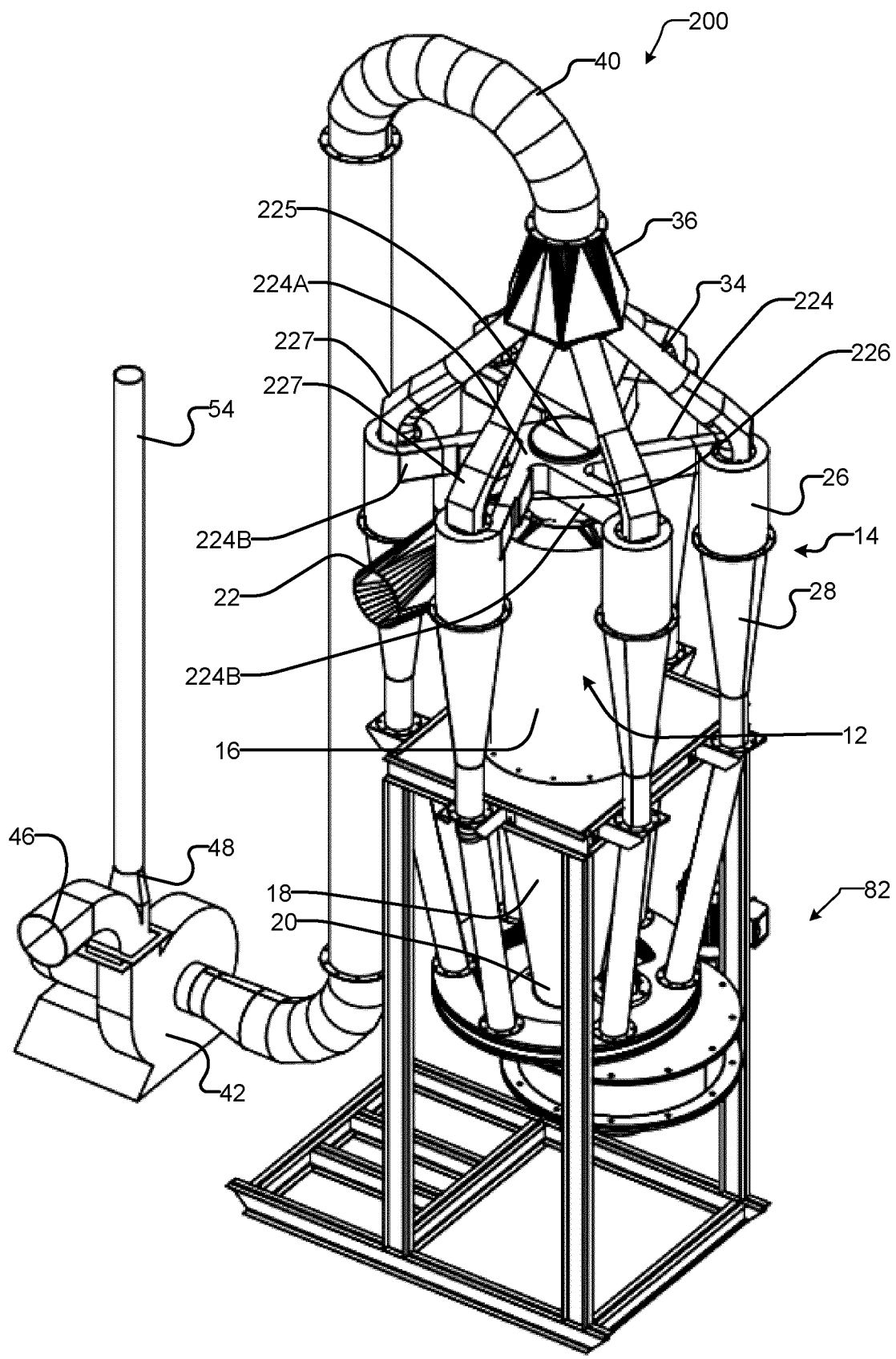
FIG. 8 is a perspective view of a cyclone system according to another example embodiment of the invention.
Figure 9:
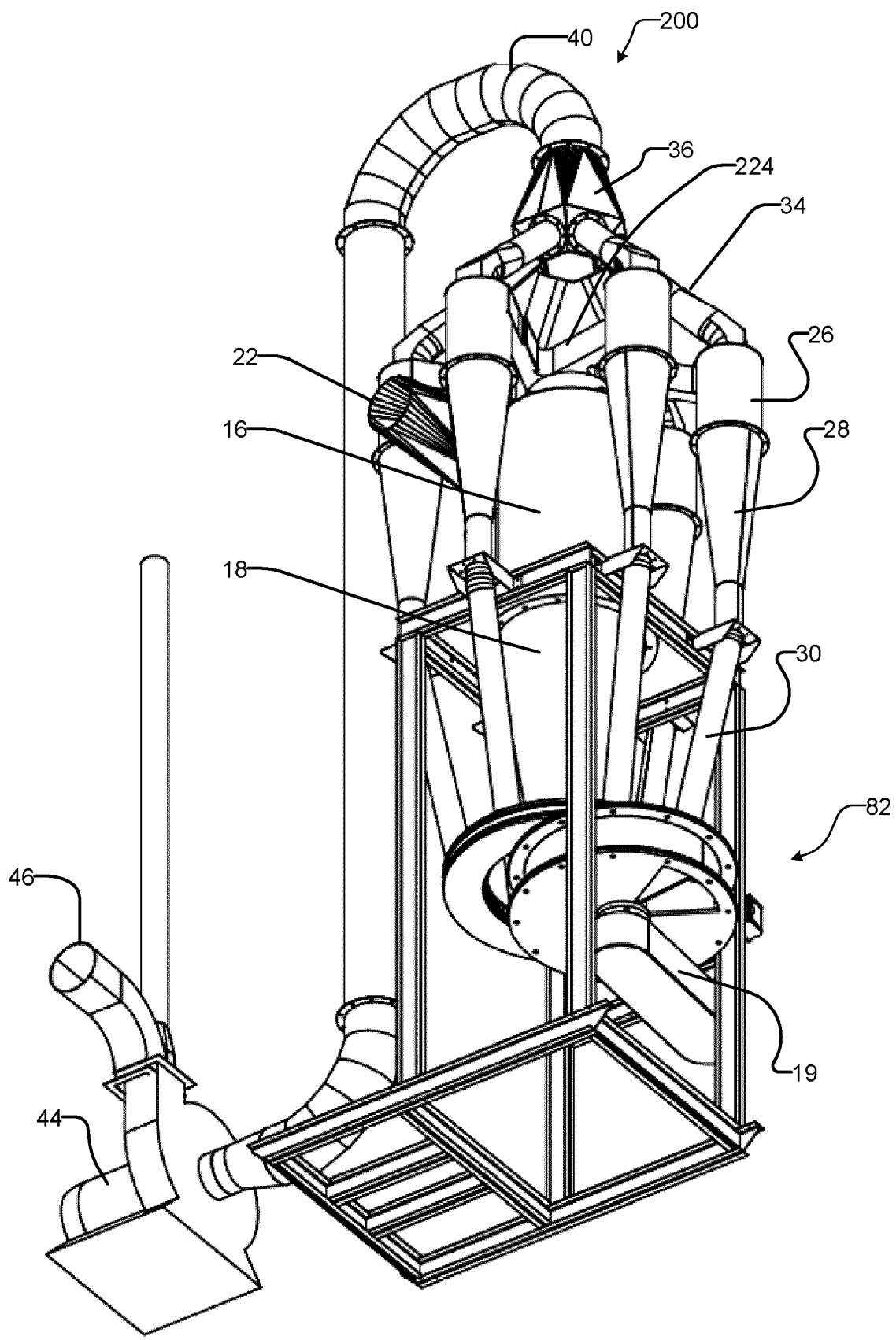
FIG. 9 is a perspective bottom view of the cyclone system of FIG. 8.
Figure 10:
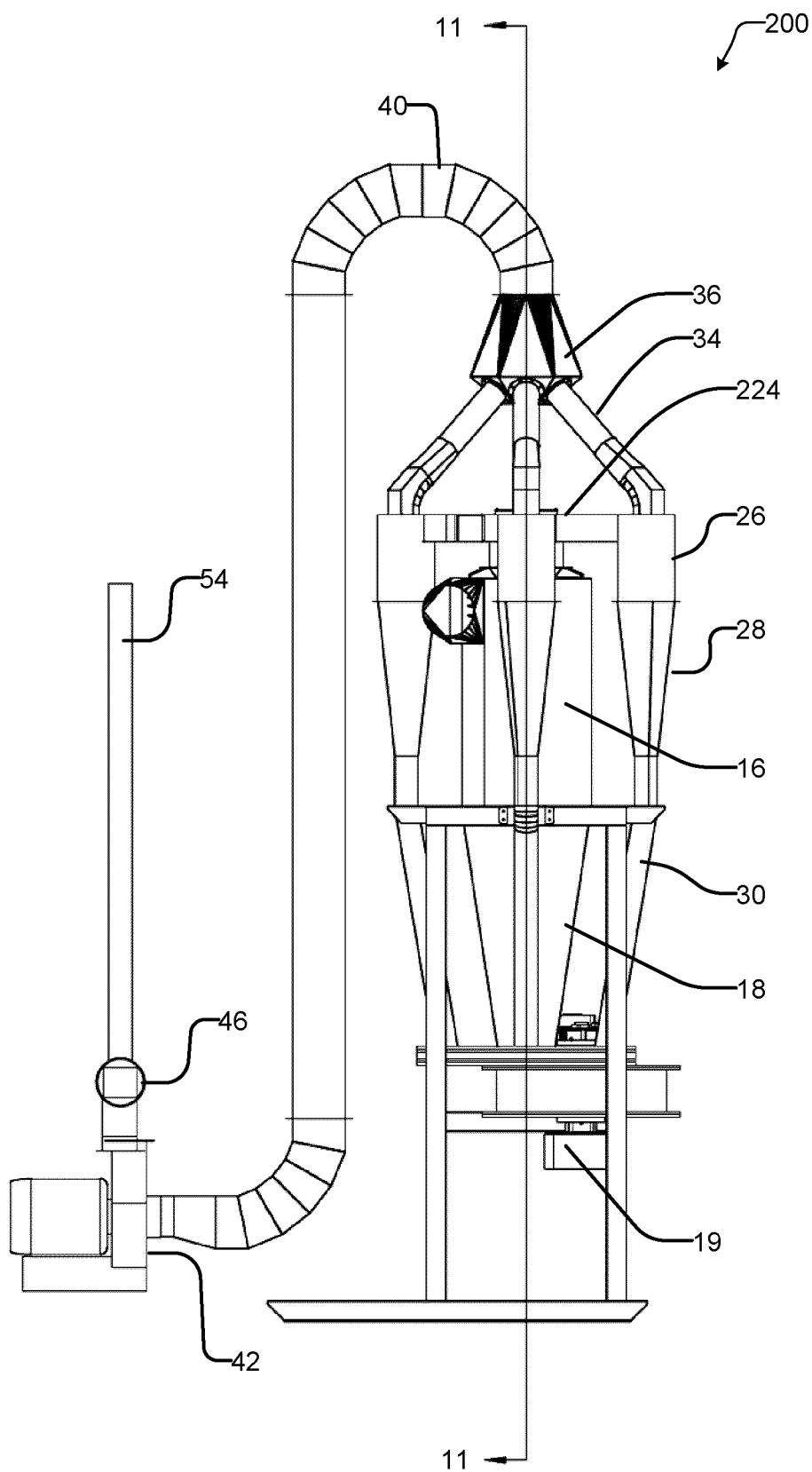
FIG. 10 is a side view of the cyclone system of FIG. 8.

In the illustrated embodiments, shaft 121 extends along the length of airlock 82 and is securely mounted on inlet 88 at the apex 123 (see FIG. 6B), and bottom cover 104 at the base 125 (see FIG. 6C).

It is convenient but not mandatory that the rotating parts of airlock 82 are driven continuously in the same direction. In alternative embodiments the direction of rotation of rotatable members may be periodically reversed.

In some embodiments, a waste conveyor (not shown) is provided under bottom cover 104 for receiving and carrying away discharged particulates.

Referring to FIG. 1, pipe 40 is connected to connector 36 at the apex of system 10 at a first end, and to an input of a main blower 42 at a second end. Main blower 42 is operable to draw air out of secondary cyclones 14. A flow splitter which may be associated with main blower 42 is operable to split the air that enters it. In some embodiments, the flow splitter splits airflow exiting main blower 42 into two portions. A major portion (at least half) is recycled back to a structure (e.g. a one or more enclosure inside a sawmill building) and a minor portion is exhausted to the atmosphere. Since only a minor portion of discharged air is exhausted to the atmosphere, this lowers the level of environmental emissions. In some embodiments, the major and minor portions are 75% and 25% of the total airflow respectively. In some embodiments, the major portion is in the range of about 65% to about 85%.

In the illustrated embodiment, main blower 42, which is operated by a motor, comprises two output ports 46, 48. Output port 46 is connected to a pipe 50 for delivering airflow to one or more enclosures 25 (shown in FIG. 5). Output port 48 is connected to a pipe 54 for exhausting air to the atmosphere. In this embodiment, output ports 46 and 48 (and their respective pipes 50 and 54), have different internal diameters. The different output port and pipe diameters allow for a difference in the amount of air that flows through the two output ports 46 and 48.

A valve or movable barrier may optionally be provided to adjust the proportion of airflow that is vented to the atmosphere and the proportion of airflow that is recycled. As best seen in FIG. 1, the internal diameter of output port 46 (and its respective pipe 50) is greater than the internal diameter of output port 48 (and its respective pipe 54). In such embodiment, the amount of air which flows into the output port 46 is thus greater than the amount of air which flows into the output port 48 in a given period of time. In some embodiments, output ports 46, 48 and pipes 50, 54 are proportionately sized so as to allow about 75% of the total air that is released from the secondary outlets 34 to flow into output portion 46 for recirculation into enclosure(s) 25. In such embodiments, the remaining airflow (about 25% of the total air) flows into output port 48 to exhaust to the atmosphere.

In some embodiments recycled air from pipe 50 is delivered to one or more enclosures 25 via air knives 56. Air knives 56 are mounted inside enclosure 25 (as best seen in FIG. 7). Air flows through air knives 56 and is discharged into enclosure 25. Air exits air knives at a high velocity and thus air knives create a high intensity air flow in enclosure 25. The airflow is directed toward a suction opening 26 in enclosure 25. Suction opening 26 draws air in at a rate greater than air discharged from air knife 56. A negative pressure is created inside enclosure 25. Particulates within enclosure 25 are drawn into system 10 via suction opening 26 and suction pipe 23.

Referring to FIGS. 4 and 5, in operation, the stream of air carrying the particulates collected from enclosure 25 flows through suction pipe 23 and into upper cylindrical portion 16 of primary cyclone 12 via primary inlet 22. Once entered upper cylindrical portion 16, the stream of contaminated air rotates in primary cyclone 12 and follows a downward spiraling vortex starting from the top end of cylindrical portion 16 toward the bottom end of conical portion 18. This vortex action creates centrifugal forces, which urge certain (e.g., heavier) particulates outwardly toward the wall of primary cyclone 12. Those particulates that approach the wall of primary cyclone 12 will eventually lose velocity, and the force of gravity will draw such particulates downward toward primary discharge outlet 20. Such particulates then fall into airlock 82. The partially cleaned air stream (e.g., the stream of air without the particulates that have been discharged into airlock 82) then travels upwards in an ascending spiraling vortex towards the top end of cylindrical portion 16 to exit primary cyclone 16 via secondary inlets 24.

Once entered secondary inlet 24, the partially cleaned air stream flows into a respective one of secondary cyclones 14.

Once the partially cleaned air stream enters each of the secondary cyclones 14, the air stream rotates in each secondary cyclone 14 and follows a downward spiraling vortex, starting from the top end of upper cylindrical portion 26 towards the bottom end of lower cylindrical portion 30. Again, the vortex action creates centrifugal forces, which urge certain (e.g., heavier) particulates toward the walls of secondary cyclones 14. The particulates that approach the walls of secondary cyclones 14 will lose velocity and fall downwards towards airlock 82.

The cleaned air stream then flows upwards following an ascending spiraling vortex toward the top end of upper cylindrical portion 26 to exit secondary cyclone 14 via each of the secondary outlets 34. The cleaned air released from each of the secondary outlets 34 is combined at single connector 36, and then exits system 10 through pipe 40.

Once the cleaned air enters main blower 42, a minor portion (e.g. approximately 25%) of the cleaned air flows through output end 48 and pipe 54 to be exhausted to the atmosphere, and a major portion (e.g. approximately 75%) of the cleaned air flows through output end 46 and pipe 50 for recirculation into the one or more enclosures 25. The approximately 75% of the cleaned air may then be used to collect newly generated particulates in the enclosures 25.

Recycling a major portion of the air withdrawn by cyclone system 10 back into a structure (e.g. a one or more enclosure inside a mill building) also advantageously reduces the energy input required to heat or cool the interior of the structure.

The air speed within cyclone system 10 may be selected depending on factors such as the type and size of the particulates to be separated and the parameters (e.g., length, surface area, and volume) of the cyclones that are used. In some embodiments, the inlet speed at primary cyclone 12 is lower than the inlet speed at secondary cyclones 14. The higher air speed and small diameters within the secondary cyclones creates higher centrifugal forces and thus facilitates separating finer particles.

In some embodiments, the inlet air speed at secondary cyclones 14 is approximately 1.1 to 1.5 times greater than the inlet air speed at primary cyclone 12. In some embodiments, the inlet speed at primary cyclone 12 is approximately 5,000 feet per minute (FPM) (about 25 m/s) and the inlet speed at secondary cyclones 14 is approximately 5,800 FPM (about 30 m/s).

FIG. 7 shows a detailed view of the inside of an example enclosure 25. In the illustrated embodiment, enclosure 25 encloses portions of twin band saws. First band saw 57A has two vertically spaced-apart wheels 58A, 62A and a blade 59A extending between wheels 58A, 62A. Second band saw 57B has two vertically spaced-apart wheels 58B, 62B and a blade 59B extending between wheels 58B, 62B. Blades 59 each loop around corresponding wheels 58 and 62. In some embodiments, lids 65A, 65B are provided to enclose enclosure 25 during cutting. In the illustrated embodiment, lids 65A, 65B are shown open. Lids 65A, 65B can be opened to access the inside of enclosure 25.

In operation, a log or board is cut by twin band saws 57A, 57B. Sawdust that is generated from the cutting flows downwardly through a gap 68 between the inner sides of lower wheels 62A, 62B toward a particle collector 61.

Particle collector 61 comprises two curved plates 70A, 70B. Curved plates 70A, 70B are positioned below lower wheels 62A, 62B. Plates 70A, 70B provide curved paths for the streams of particulates to follow. Such curved paths cause the particulates to accelerate towards the lower end of particle collector 61 in the direction of waste conveyer 76. The optimal dimensions of plates 70A, 70B depend on various parameters of the system. Such parameters include, for example, the position of the machine center at which the generated particulates flow from, the position and size of the waste conveyor, and the speed of the airflow. In some embodiments, plates 70A, 70B are sized such that the stream of particulates follows an arc length of about 70 degrees.

Plates 70A, 70B diverge into their respective downward ducts 74A, 74B near the end of the curvature. Downward ducts 74A, 74B extend downwardly in the direction of waste conveyer 76 to exit enclosure 25. Particulates from plates 70A, 70B that do not fall downwardly into ducts 74A, 74B (e.g. small dust particles) continue to flow in the transverse direction through side ducts 72A, 72B respectively.

Particle separator 61 also comprises upper discharge ducts 78A, 78B positioned adjacent to outer sides 79A, 79B of lower wheels 62A, 62B. In the illustrated embodiment, upper discharge ducts 78A, 78B are positioned at approximately the 180 degree point of a unit circle on lower wheels 62A, 62B. Upper discharge ducts 78A, 78B are positioned to capture any particulates that are carried around lower wheels 62A, 62B.

Each upper discharge duct 78A, 78B and its respective side duct 72A, 72B merge into a duct 80A, 80B. Ducts 80A and 80B then merge into suction pipe 23. Suction pipe 23 brings the flow of air carrying particulates to system 10.

The speed of airflow within the separator 61 varies. In some embodiments, the speed of airflow at the top of plates 70A, 70B is higher than the speed of airflow at the bottom of plates 70A, 70B. The higher speed of airflow at the top of plates 70A, 70B helps to drive the heavier particulates to fall downwardly towards waste conveyor 76 via downward ducts 74A, 74B. In some embodiments, the speed of airflow at the top of plates 70A, 70B is approximately 1 to approximately 1.5 times higher than the speed of airflow near the bottom of plates 70A, 70B. In some embodiments, the speed of airflow at the top of plates 70A, 70B is approximately 5,000 FPM (about 25 m/s), and the speed of airflow at the bottom of the plates 70A, 70B is approximately 3,800 FPM (about 19 m/s). In some embodiments, the speed of airflow increases near suction pipe 23 to facilitate transporting the unseparated particulates into system 10 for further separation. In some embodiments, the speed of airflow used for transporting the unseparated particulates towards system 10 is approximately 5,000 FPM (about 25 m/s).

In operation, the approximately 75% of the cleaned air that is released from system 10 enters one or more enclosures 25 through air knives 56. The about 75% of the cleaned air collects newly generated dust from enclosures 25, creating a new stream of contaminated air. A greater amount of contaminated air exits enclosures 25 than the amount of cleaned air that enters enclosures 25. This generates negative pressure within enclosures 25 so that air flows into but not out of enclosures 25, thereby preventing contaminated air from escaping enclosures 25.

In some embodiments, more than one enclosure 25 is provided. In such embodiments, air flow carrying particulates that are released from each of the enclosures may be transported into system 10 for further separation.

The amount of particulates that can be removed from air using systems according to the different embodiments of this invention can be higher compared to conventional particulate separators. Systems as described herein may be less costly to operate and maintain than bag houses and other conventional particle separation systems.

In a prototype embodiment, the length of primary cyclone 12 is about 68 inches (or about 173 cm) and the diameter of upper cylindrical portion 16 of primary cyclone 12 is about 19 inches (or about 48 cm). The length of each of secondary cyclones 14 is about 35 inches (or about 89 cm) and the diameter of each of upper cylindrical portion 26 of secondary cyclones 14 is about 8.5 inches (or about 22 cm). The air speed at primary inlet 22 is about 5,000 FPM (about 23 m/s) and the air speed at secondary inlets 24 is about 5,800 FPM (about 29 m/s). Systems as described herein may be designed in a wide range of sizes. One can determine the volume of particulates that are expected to be generated, from that determine the volume of air flow required, and from that determine appropriate dimensions for primary and secondary cyclones.

In tests conducted using the prototype, about 90% to about 98.2% of total particulates fed into the prototype system were separated after one cyclonic separation cycle. In particular, about 45% to about 91% of total particulates were separated by the primary cyclone, and about 7% to about 48% of total particulates were further separated by the secondary cyclones. The amount of particulates that can be separated per cyclonic separation cycle depends on the type of particulates that is fed into the cyclonic systems for separation. In the prototype testing, the amount of particulates that are exhausted to the atmosphere per separation cycle is about 0.22% to about 1.32% of total particulates that are fed into the cyclonic system. For example, in one experiment, 976 grams of particulates from a debarker were fed into the prototype system. 502 grams were recovered by the primary cyclone. An additional 382 grams were recovered by the secondary cyclones. In another experiment, 396 grams of dust from a vertical double arbor saw was fed to the prototype system. 359 grams were recovered by the primary cyclone. Another 29 grams were recovered by the secondary cyclones. In another experiment, 1200 grams of white flour was fed to the prototype system. 541 grams were recovered by the primary cyclone. Another 577 grams were recovered by the secondary cyclones.

One advantage of certain embodiments of this invention is that a further filtration step is not necessary. Embodiments as described above can be capable of removing fine particulates from air without filters. This reduces extra costs for maintaining and operating an additional filtration system.

Although additional filters are often not necessary, there may be some applications where additional filtration may be beneficial. For example, one or more cleaning systems (e.g., a filtration system) may be provided downstream of enclosures 25 and/or cyclone system 10 for further cleaning of the airflow.

Another aspect of the invention relates to methods for removing dust or other particulates from a structure while reducing costs for heating or cooling the structure. Such methods may involve providing enclosures 25 to collect particulates from one or more sources in the structure and introducing a significant portion of recycled air into the enclosures at the same time as air is withdrawn from the enclosures to a particulate removal system (e.g. system 10). More than one of the enclosures 25 shown in FIG. 7 may be connected with cyclone system 10. In some embodiments, approximately 25% of the total airflow from system 10 is exhausted to the environment. In such embodiments, approximately 75% of the total airflow released from system 10 is recycled and proportionately distributed into the one or more enclosures 25. For example, in such embodiments, if a system comprises two enclosures, wherein the inlets of the enclosures have the same size, approximately 37.5% of the total airflow enters each enclosure. Approximately 100% of the combined output from the enclosures enters cyclone system 10. Recycling air between enclosures 25 and system 10 can significantly lower heating costs since less air from the interior of the building will be released to the exterior.

In some embodiments, one or more enclosures 25 and cyclone system 10 are used in a sawmill to remove sawdust from sawdust sources in the sawmill. In some embodiments, one or more enclosures 25 enclose saws, planers, or other wood cutting machinery and air from such enclosures is processed by a cyclone system 10.

Structures and methods as described herein may be used in conjunction with any dust generating equipment, including but not limited to, wood cutting machinery, flour milling equipment, grain handling equipment, coal handling and processing equipment, etc.

FIGS. 8 to 13E show an example two-stage cyclone system 200 that is similar to cyclone system 10 as illustrated in FIGS. 1 to 6E and described above. In FIGS. 8 to 13E many components similar to those also present in cyclone system 10 are identified by the same reference numbers used in FIGS. 1 to 6E for clarity. Cyclone system 200 is generally similar to cyclone system 10 but has various modifications as depicted in the drawings. These include the additional features discussed below.

Cyclone system 200 has a scroll type distributor 224 that is operative to direct air exiting main cyclone 12 into inlets of secondary cyclones 14. Distributor 224 includes a central plenum 224A connected to collect air exiting from main cyclone 12 and arms 224B which extend to each secondary cyclone 14. Arms 224B deliver air tangentially into upper portions 26 of secondary cyclones 14.

Cyclone system 200 includes explosion vents designed to release pressure in case of an explosion within cyclone system 200. In the illustrated embodiment an explosion vent 225 is provided on central plenum 224A, explosion vents 226 are provided on each of arms 224B and explosion vents 227 are provided at the outlet of each secondary cyclone 14. The explosion vents may, for example comprise hinged flaps that are normally closed but open quickly in the event of overpressure within cyclone system 200.

Figure 13A:
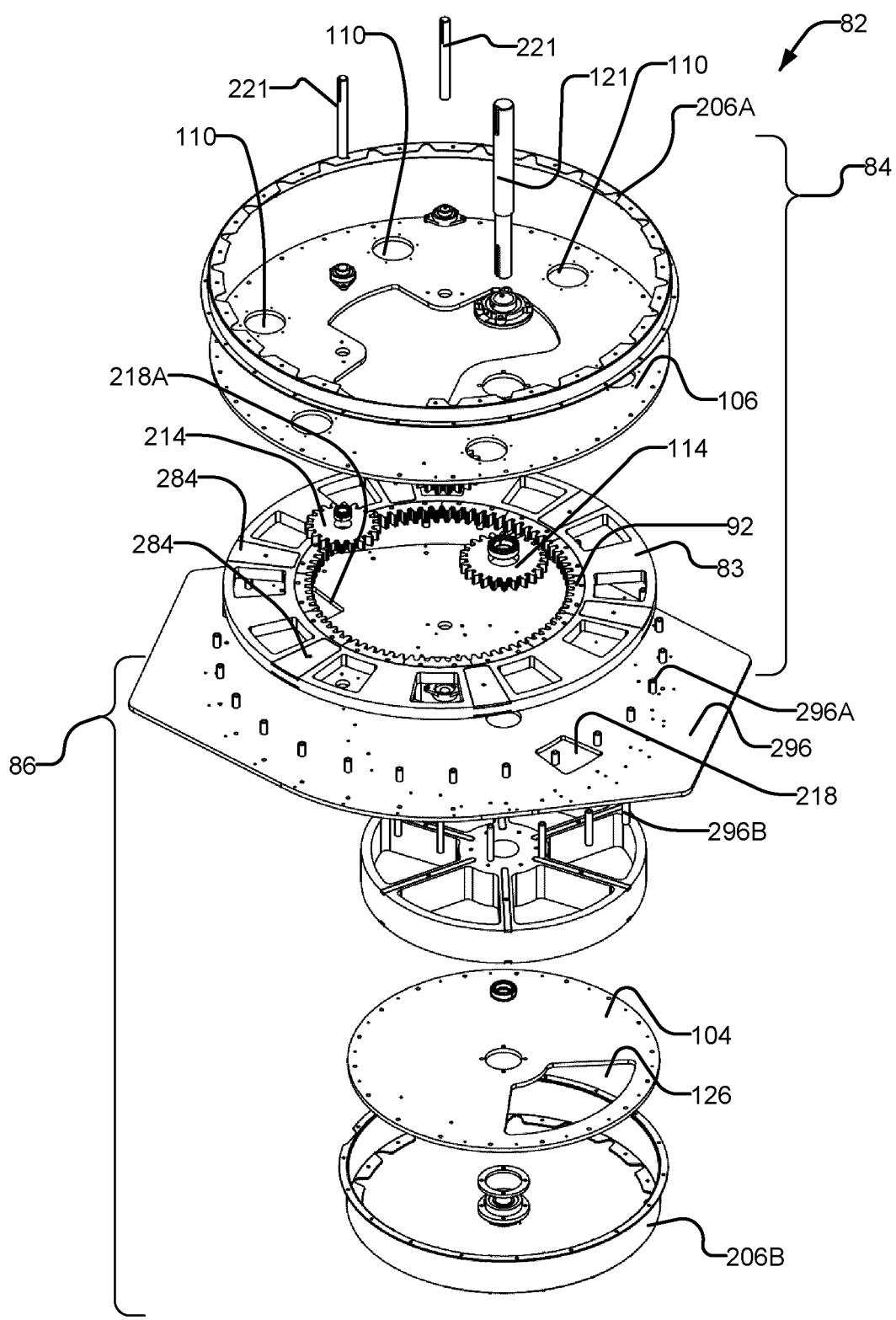
FIG. 13A is an isolated exploded view of an airlock of the cyclone system of FIG. 8.

Another area where cyclone system 200 differs from cyclone system 10 is in details of the design of the airlock as illustrated in FIGS. 13A to 13E. FIG. 13A shows dust sealing caps 206A and 206B that respectively seal around primary and secondary airlocks 84 and 86 to prevent egress of particulates.

Figure 13B:
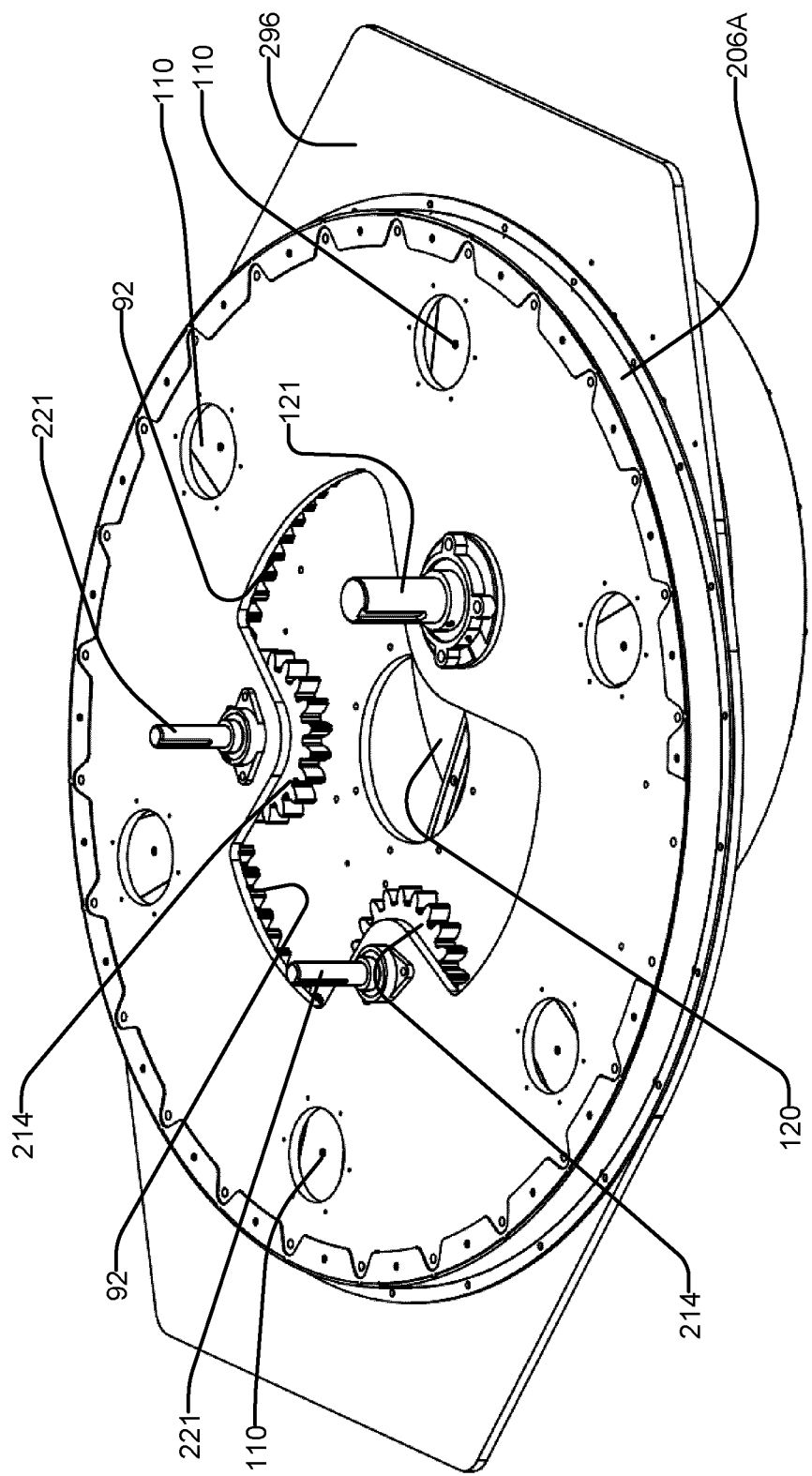
FIG. 13B is a top perspective view of the airlock of FIG. 13A.
Figure 13C:
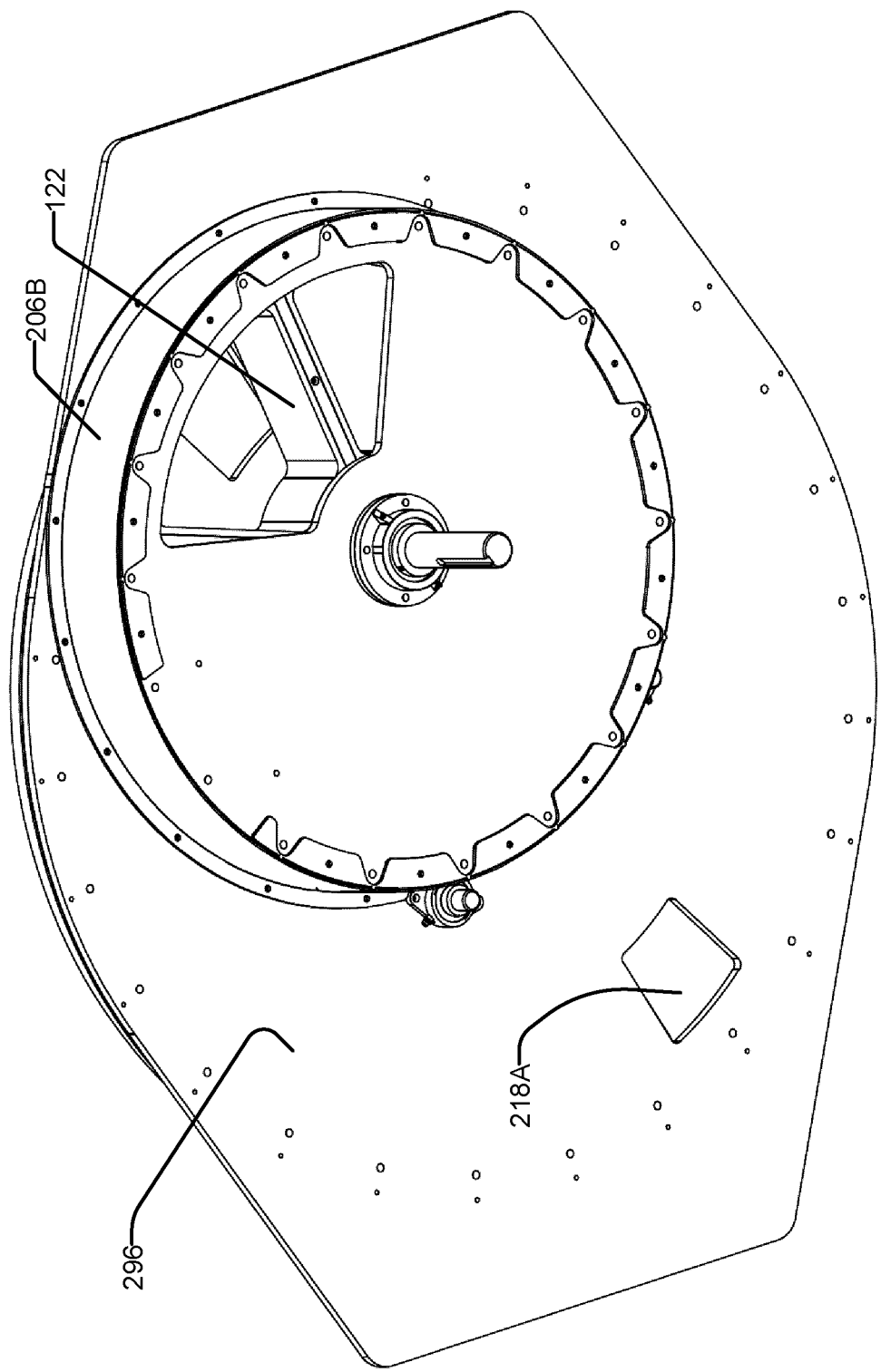
FIG. 13C is a bottom perspective view of the airlock of FIG. 13A.

FIG. 13B shows additional pinions 214 that help to maintain ring gear 92 centered. In the illustrated embodiments additional pinions 214 are different in size (in this example, smaller/fewer teeth) from pinion 114. Ring gear 92 may optionally be driven by one or both of pinions 214 instead of by pinion 114 to provide a different speed of rotation of ring gear 92 for a given speed of rotation of shaft 121. To facilitate this, a transmission such as a gear drive, chain drive, belt drive etc. may be provided between shaft 121 and shafts 221 which support pinions 214 and pinion 214 may be coupled to rotate relative to shaft 221.

As shown in FIG. 13A, body 83 may comprise wear pads 283 of a suitable material (e.g. bronze) that provide a sliding interface between body 83 and the plates 96 and 106 between which body 83 rotates.

Figure 13D:
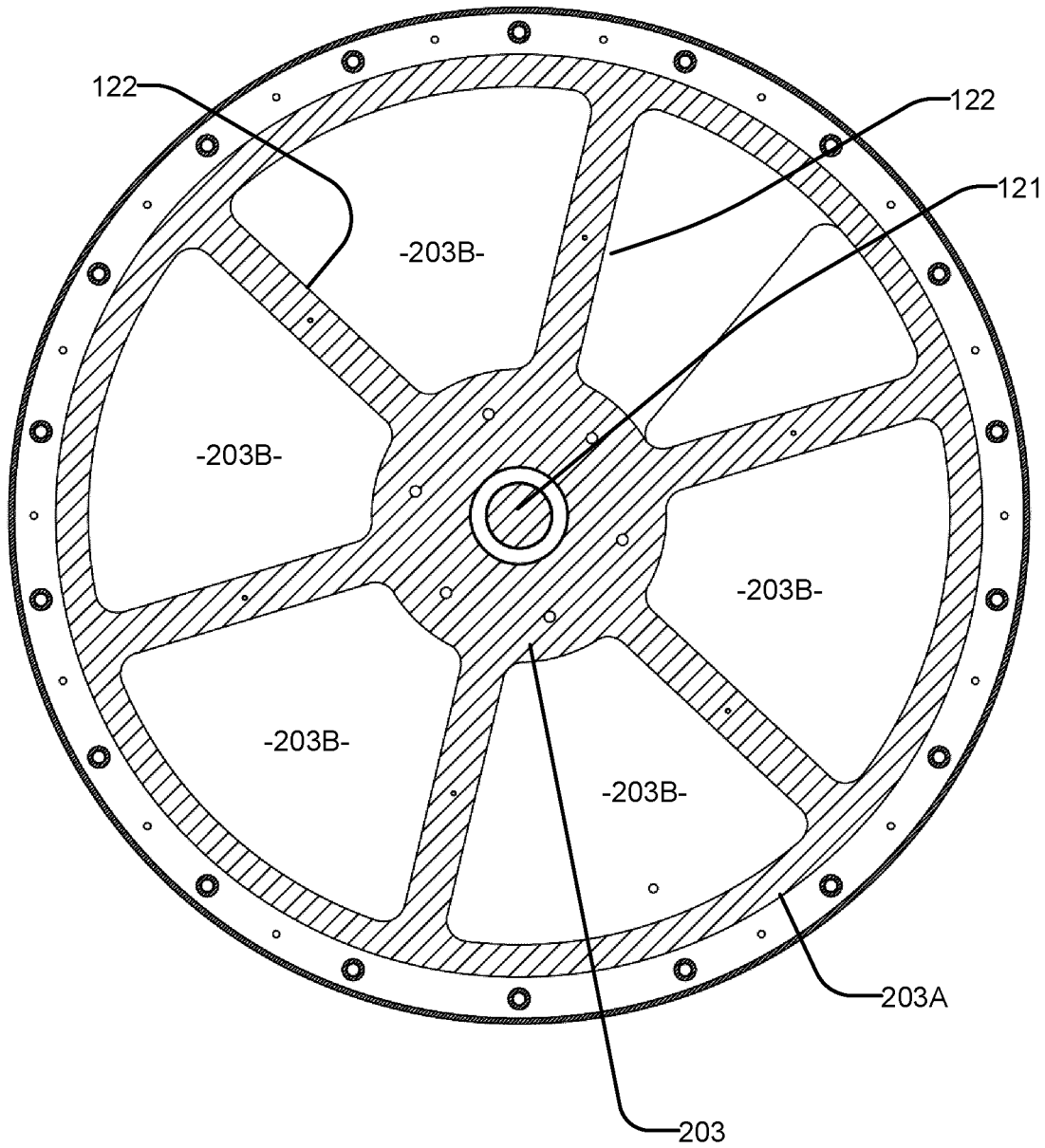
FIG. 13D is a bottom plan view of the airlock of FIG. 13A.
Figure 13E:
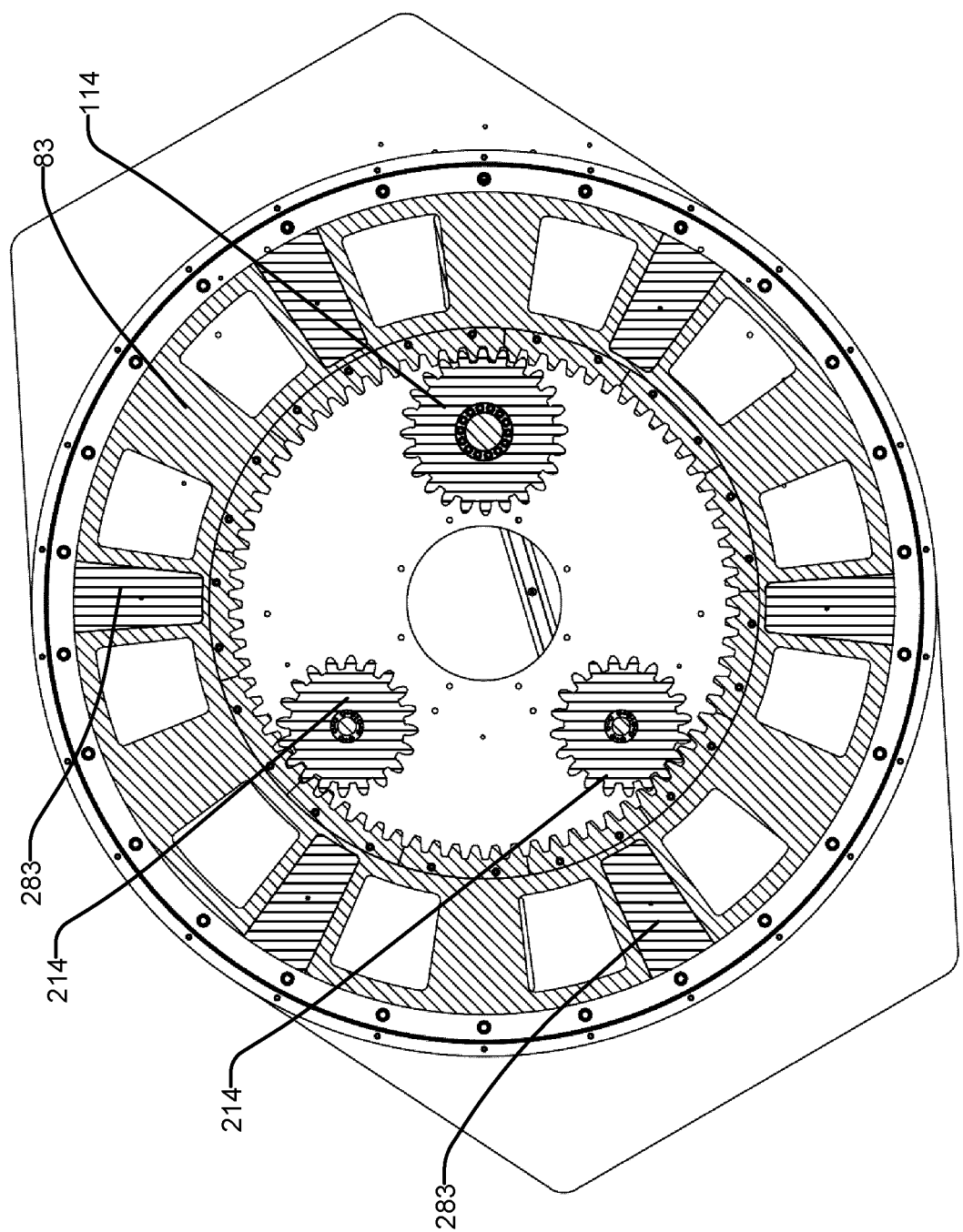
FIG. 13E is a sectional top plan view of the airlock of FIG. 13B.

FIG. 13D shows a barrier member 203 that provides paddles 122. Radial outer ends of paddles 122 are connected by a cylindrical outer rim 203A to define pockets 203B between adjacent paddles 122.

In cyclone system 200 functions of outlet plate 96 and top cover 98 are combined in a single plate 296. Plate 296 has openings 218 and 218A through which particulates collected in the pockets of body 83 may fall. Opening 218 A is located so that it is offset from all of apertures 110. Body 83 blocks direct air flow between opening 218A and apertures 110 for all angles of rotation of body 83. Opening 218A may exit directly onto a conveyor or other particulate outlet from cyclone system 200.

FIG. 13A shows tubular spacers 296A which maintain a desired spacing between plates 296 and 106 and tubular spacers 296B which maintain a desired spacing between plates 296 and 104.

Apparatus according to various implementations of the present invention may comprise some, none, any individual one of or any combination of the additional features of cyclone system 200.

While the above description contains many specifications, these should not be construed as limitations on the scope of the invention, but as examples of various embodiments thereof. Many other ramifications and variations are possible within the teachings of the various embodiments.

Thus the scope should be determined by the appended claims and their legal equivalents, and not by the examples given.

INTERPRETATION OF TERMS

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;

"major proportion" means 50% or more;

"minor proportion" means less than 50%;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a member, closure, flap, pocket, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A two-stage particulate separator, comprising:
a primary cyclone;
a plurality of secondary cyclones circumferentially spaced around the primary cyclone;
each of the cyclones having an inlet at an upper end thereof and a discharge outlet at a lower end thereof, the inlets of the secondary cyclones being in communication with the primary cyclone; and
an airlock coupled to the discharge outlets of the cyclones, wherein the airlock comprises a secondary airlock connected to the discharge outlets of the secondary cyclones and a primary airlock stacked with the secondary airlock in a vertical direction and coupled to the outlet of the primary cyclone.

2. The two-stage particulate separator according to claim 1, wherein the secondary airlock comprises an annular rotatable body having a central aperture and being penetrated by a plurality of circumferentially-spaced apertures shaped to receive and dispense particulates discharged from the secondary cyclones.

3. The two-stage particulate separator according to claim 2 wherein a discharge conduit from the primary cyclone passes through the central opening of the rotatable body.

4. The two-stage particulate separator according to claim 2 wherein the rotatable body comprises a ring gear driven to rotate by a pinion located in the central opening of the rotatable body.

5. The two-stage particulate separator according to claim 4 wherein the primary airlock comprises:
a top having an inlet opening and a bottom having an outlet opening wherein the inlet opening and outlet opening are circumferentially spaced apart from one another; and
a rotatable barrier member comprising radially-extending vanes between the top and bottom of the primary airlock.

6. The two-stage particulate separator according to claim 5 wherein the pinion is coupled to rotate with the rotatable barrier member.

7. The two-stage particulate separator according to claim 5 wherein, relative to an axis of rotation of the barrier member the inlet opening and the outlet opening of the primary air lock are angularly offset from one another by an angular separation larger than an angular separation of adjacent ones of the paddles.

8. The two-stage particulate separator according to claim 5 wherein the secondary airlock comprises an outlet located to discharge particulates into the primary airlock through an opening that is circumferentially offset from the outlet opening of the primary air lock.

9. The two-stage particulate separator according to claim 1 wherein the primary airlock comprises:
a top having an inlet opening and a bottom having an outlet opening wherein the inlet opening and outlet opening are circumferentially spaced apart from one another; and
a rotatable barrier member comprising radially-extending vanes between the top and bottom of the primary airlock.

10. The two-stage particulate separator according to claim 1 wherein the secondary airlock comprises one or more outlets and at least one of the one or more outlets is connected to discharge into the primary airlock.

11. The two-stage particulate separator according to claim 2, wherein the body comprises a plurality of ring-shaped discs stacked in the vertical direction, the discs having the apertures defined in the body, and wherein the apertures are on circles of the same diameter.

12. The two-stage particulate separator according to claim 11, the airlock further comprising an outlet plate positioned between the primary and secondary airlocks, the outlet plate comprising an outlet aperture positioned in alignment with an inlet aperture defined in the primary airlock.

13. The two-stage particulate separator according to claim 12, wherein the apertures defined in the rotatable body can be rotated into communication with the outlet aperture defined in the outlet plate and the inlet aperture defined in the primary airlock.

14. The two-stage particulate separator according to claim 13, wherein the particulates discharged from the primary and the secondary cyclones exit through a discharge opening defined in a bottom cover of the primary airlock.

15. The two-stage particulate separator according to claim 14, the airlock further comprising a rotor operable to rotate the body of the secondary airlock, the rotor having:
a rotatable shaft extending longitudinally along a length of the airlock coupled to a radially extending vanes positioned within a housing mounted on top of the bottom cover of the primary airlock; and a gear having a plurality of outward teeth being in engagement with a plurality of inward teeth defined in one of the discs in the secondary airlock.

16. A two-stage particulate separator, comprising:
a primary cyclone;
a plurality of secondary cyclones circumferentially spaced around the primary cyclone;
each of the cyclones having an inlet at an upper end thereof and a discharge outlet at a lower end thereof, the inlets of the secondary cyclones being in communication with the primary cyclone;
the secondary cyclones having secondary outlets in communication with a connector;
an airlock coupled to the discharge outlets of the cyclones; and
a pipe connected to the connector at a first end and to an air splitter at a second end, the air splitter having a first output port adapted to exhaust air to the atmosphere, and a second output port adapted to recycle air into one or more enclosures.

17. The two-stage particulate separator according to claim 16, wherein the first and second output ports are proportionately sized to allow a major portion of the total airflow to exhaust to the atmosphere, and a minor portion of the total airflow to recycle into the one or more enclosures.

18. The two-stage particulate separator according to claim 17, wherein the first and second output ports are proportionately sized to allow about 75% of the total airflow to exhaust to the atmosphere, and about 25% of the total airflow to recycle into the one or more enclosures.

19. The two-stage particulate separator according to claim 18, wherein the one or more enclosures each enclose a point of particulate generation.

20. The two-stage particulate separator according to claim 18, wherein at least one of the one or more enclosures encloses a saw.

21. The two-stage particulate separator according to claim 19, wherein the one or more enclosures further comprises a first separation system.

22. The two-stage particulate separator according to claim 21, wherein the first separation system comprises:
two curved plates positioned under the cutting source, each having a curvature,
two diverging ducts positioned near an end of the curvature of each curved plate, the two diverging ducts having a first duct extending in a downward direction towards an outlet of the system and a second duct extending in a transverse direction;
two upper discharge ducts, each positioned at an outer side of its respective curved plates, opposite to the side of the curvature, wherein the second ducts and upper discharge ducts merge to form a suction pipe connectable to the primary inlet.

23. The two-stage particulate separator according to claim 16, comprising a blower operable to draw air out of the secondary cyclones, the blower located between the connector and the air splitter.

24. A two-stage particulate separator, comprising:
a primary cyclone having a tangential air inlet and an axial air outlet at an upper end thereof, a generally conical lower portion and a particle discharge opening at a lower end of the lower portion;
at least three secondary cyclones circumferentially spaced around the primary cyclone, the secondary cyclones each comprising a tangential air inlet and an axial air outlet at an upper end thereof, a generally conical lower portion and a particle discharge opening at a lower end of the lower portion wherein the air inlets of the secondary cyclones are connected to receive air from the air outlet of the primary cyclone;
a secondary airlock comprising a plurality of inlet openings spaced circumferentially apart around a generally circular path where in the particulate outputs of each of the secondary cyclones is coupled to one of the inlet openings of the secondary airlock, the secondary airlock having at least one outlet opening and the at least one output opening is offset relative to each of the input openings, the secondary airlock comprising an annular body mounted for rotation between the inlet openings and the outlet openings, the annular body penetrated by a plurality of angularly spaced apart apertures lying on the circular path;
a drive motor connected to rotate the rotatable member to carry the apertures past the inlet openings to receive particulate material from the secondary cyclones and to carry the received particulate material to the outlet openings; and
a primary airlock located below the secondary airlock, the primary airlock comprising an inlet opening connected to receive particulate material from the particle discharge opening of the primary cyclone along a path passing through a central aperture of the annular rotatable member of the secondary air lock.

25. The two-stage particulate separator according to claim 24 wherein the primary air lock comprises a barrier member comprising radially extending paddles mounted for rotation about an axis that is offset from the inlet opening of the primary airlock and a primary airlock outlet opening angularly spaced apart from the inlet opening, the paddles having a radial extent such that the paddles sweep past the primary airlock inlet opening and the primary airlock outlet opening upon rotation of the barrier member.

26. The two-stage particulate separator according to claim 25 wherein the airlock comprises a top plate, a middle plate and a bottom plate, the annular body of the secondary airlock lies between the top plate and the middle plate and the barrier member of the primary airlock lies between the middle plate and the bottom plate.

27. The two-stage particulate separator according to claim 25 wherein the drive motor is connected to drive rotation of both the barrier member and the annular body.

28. The two-stage particulate separator according to claim 27 comprising a speed reducer coupled between the barrier member and the annular body.

29. The two-stage particulate separator according to claim 28 wherein a gear ratio of the speed reducer is in the range of 3 to 1 to 6 to 1.

30. The two-stage particulate separator according to claim 27 wherein the speed reducer comprises internal gear teeth on the annular body in engagement with a pinion driven by the drive motor.

* * * * *